(12) United States Patent
Ruggiero

(10) Patent No.: US 7,760,968 B2
(45) Date of Patent: Jul. 20, 2010

(54) VIDEO IMAGE PROCESSING WITH PROCESSING TIME ALLOCATION

(75) Inventor: Carl J. Ruggiero, Tigard, OR (US)

(73) Assignee: NVIDIA Corporation, Santa Clara, CA (US)

( * ) Notice: Subject to any disclaimer, the term of this patent is extended or adjusted under 35 U.S.C. 154(b) by 1379 days.

(21) Appl. No.: 11/183,238

(22) Filed: Jul. 15, 2005

(65) Prior Publication Data

US 2006/0018563 A1 Jan. 26, 2006

Related U.S. Application Data

(63) Continuation-in-part of application No. 11/036,462, filed on Jan. 13, 2005, now Pat. No. 7,308,159.

(60) Provisional application No. 60/537,082, filed on Jan. 16, 2004.

(51) Int. Cl.
*G06K 9/54* (2006.01)
*G06K 9/60* (2006.01)

(52) U.S. Cl. .................. 382/303; 382/304; 382/306

(58) Field of Classification Search .......... 382/298–308
See application file for complete search history.

(56) References Cited

U.S. PATENT DOCUMENTS

| 4,641,188 A | 2/1987 | Dischert |
| 4,881,125 A | 11/1989 | Krause |
| 4,982,280 A | 1/1991 | Lyon et al. |
| 5,155,816 A | 10/1992 | Kohn |
| 5,301,020 A | 4/1994 | Cassereau |

(Continued)

FOREIGN PATENT DOCUMENTS

EP  1134655 A2  9/2001

(Continued)

OTHER PUBLICATIONS

"International Search Report and Written Opinion for Application No. PCT/US2006/027379, date mailed Dec. 27, 2006", 15 Pages.

(Continued)

*Primary Examiner*—Wes Tucker
(74) *Attorney, Agent, or Firm*—Alleman Hall McCoy Russell & Tuttle LLP

(57) ABSTRACT

This document discusses, among other things, systems and methods that track overall time for processing operations such that the processing time can be shared among the resources in an efficient manner. Processing time can be shifted to image processing where the time will provide the most benefit to image quality. Moreover, access time from one process is banked to be used by a subsequent process or on a subsequent group of pixels.

This document also discusses, among other things, systems and methods that provide additional processing power on an as needed basis. In an example, a processing stage and its controller are outside the normal pixel processing flow path. When it is determined that additional processing is required, the processing stage and its controller are activated to perform the additional processing.

This document further discusses, among other things, systems and methods that provide parallel processing in a processing stage such that the data can flow internal to the controller linked to the processing stage and data can flow globally.

43 Claims, 27 Drawing Sheets

U.S. PATENT DOCUMENTS

| | | | |
|---|---|---|---|
| 5,317,398 A | 5/1994 | Casavant et al. | |
| 5,347,314 A | 9/1994 | Faroudja et al. | |
| 5,365,273 A | 11/1994 | Correa et al. | |
| 5,398,071 A | 3/1995 | Gove et al. | |
| 5,414,469 A | 5/1995 | Gonzales et al. | |
| 5,450,599 A | 9/1995 | Horvath et al. | |
| 5,469,223 A | 11/1995 | Kimura | |
| 5,508,747 A * | 4/1996 | Lee | 348/441 |
| 5,513,282 A * | 4/1996 | Williams | 382/303 |
| 5,532,751 A | 7/1996 | Lui | |
| 5,563,660 A | 10/1996 | Tsukagoshi | |
| 5,614,952 A | 3/1997 | Boyce et al. | |
| 5,621,470 A | 4/1997 | Sid-Ahmed | |
| 5,631,706 A | 5/1997 | Tsunashima | |
| 5,661,525 A | 8/1997 | Kovacevic et al. | |
| 5,689,305 A | 11/1997 | Ng et al. | |
| 5,757,670 A | 5/1998 | Ti et al. | |
| 5,761,516 A | 6/1998 | Rostoker et al. | |
| 5,771,073 A | 6/1998 | Lim | |
| 5,784,175 A | 7/1998 | Lee | |
| 5,790,196 A | 8/1998 | Sun et al. | |
| 5,790,714 A | 8/1998 | McNeil et al. | |
| 5,920,659 A | 7/1999 | Iverson et al. | |
| 5,943,099 A | 8/1999 | Kim | |
| 6,005,621 A | 12/1999 | Linzer et al. | |
| 6,038,256 A | 3/2000 | Linzer et al. | |
| 6,064,407 A | 5/2000 | Rogers | |
| 6,121,978 A | 9/2000 | Miler | |
| 6,157,365 A | 12/2000 | Callway | |
| 6,184,908 B1 | 2/2001 | Chan et al. | |
| 6,189,064 B1 | 2/2001 | MacInnis et al. | |
| 6,201,577 B1 | 3/2001 | Swartz | |
| 6,282,587 B1 | 8/2001 | Priem et al. | |
| 6,301,428 B1 | 10/2001 | Linzer | |
| 6,327,000 B1 | 12/2001 | Auld et al. | |
| 6,339,434 B1 | 1/2002 | West et al. | |
| 6,356,589 B1 | 3/2002 | Gebler et al. | |
| 6,366,317 B1 | 4/2002 | Mattison et al. | |
| 6,512,550 B1 | 1/2003 | de Garrido et al. | |
| 6,545,719 B1 | 4/2003 | Topper | |
| 6,636,222 B1 | 10/2003 | Valmiki et al. | |
| 6,671,319 B1 | 12/2003 | Chang et al. | |
| 6,680,752 B1 | 1/2004 | Callway | |
| 6,690,726 B1 | 2/2004 | Yavits | |
| 6,697,122 B2 | 2/2004 | Kim | |
| 6,748,019 B1 | 6/2004 | Lin et al. | |
| 6,775,334 B1 | 8/2004 | Liu et al. | |
| 6,781,601 B2 | 8/2004 | Cheung | |
| 2004/0181370 A1 | 9/2004 | Froehlich et al. | |
| 2006/0018562 A1 | 1/2006 | Ruggiero | |
| 2006/0022984 A1 | 2/2006 | Ruggiero | |

FOREIGN PATENT DOCUMENTS

| | | | |
|---|---|---|---|
| WO | WO-00/77626 A1 | 12/2000 | |
| WO | WO-2007/011732 A1 | 1/2007 | |
| WO | WO-2007/011872 A2 | 1/2007 | |

OTHER PUBLICATIONS

Choelwhan, L., et al., "Partitioning and Scheduling for parallel image processing operations", *Parallel and Distributed Processing*, (Oct. 25, 1995), 86-90.

Weil, F., et al., "Dynamic Intelligent Scheduling and Control of Reconfigurable Parallel Architectured for Computer Vision/Image Processing", *Journal of Parallel and Distributed Computing*, 13(3), (Nov. 1, 1991), 273-285.

* cited by examiner

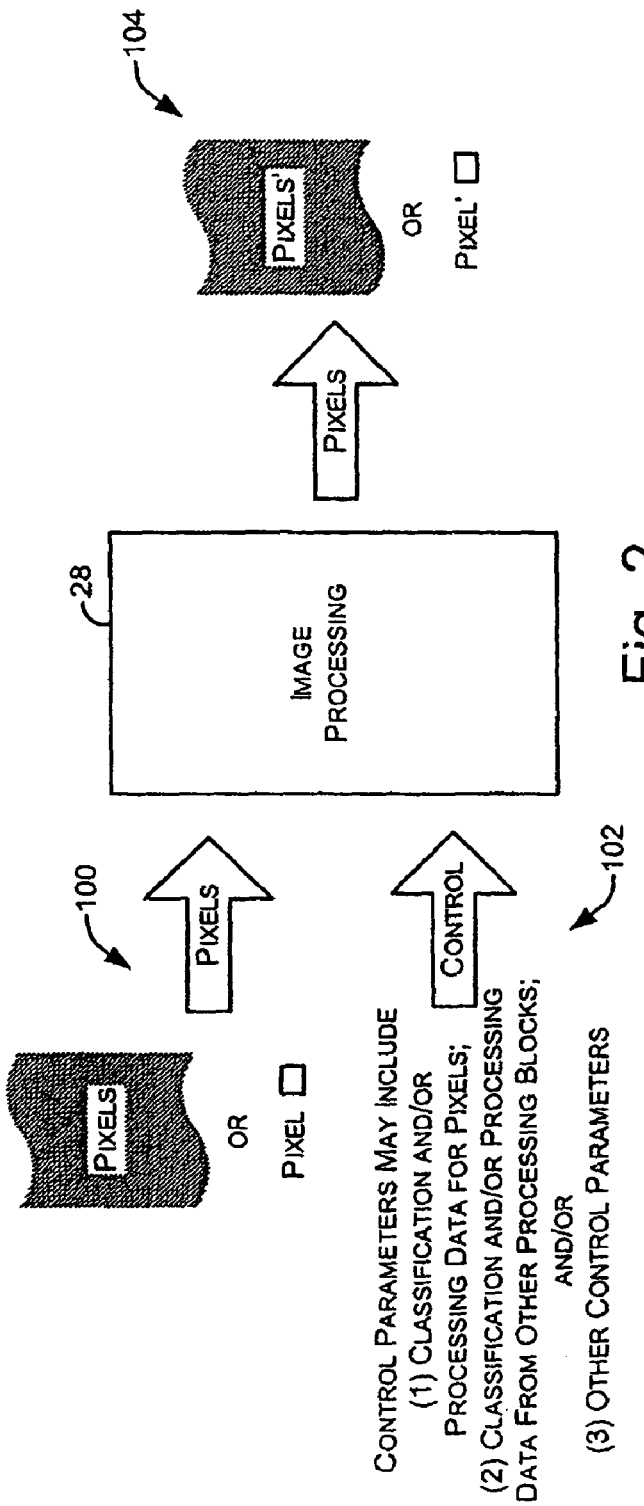
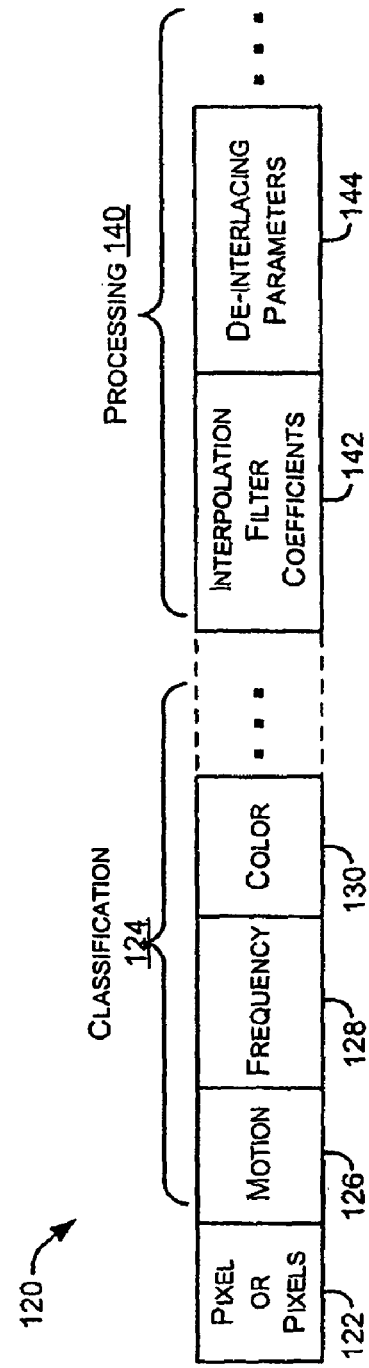

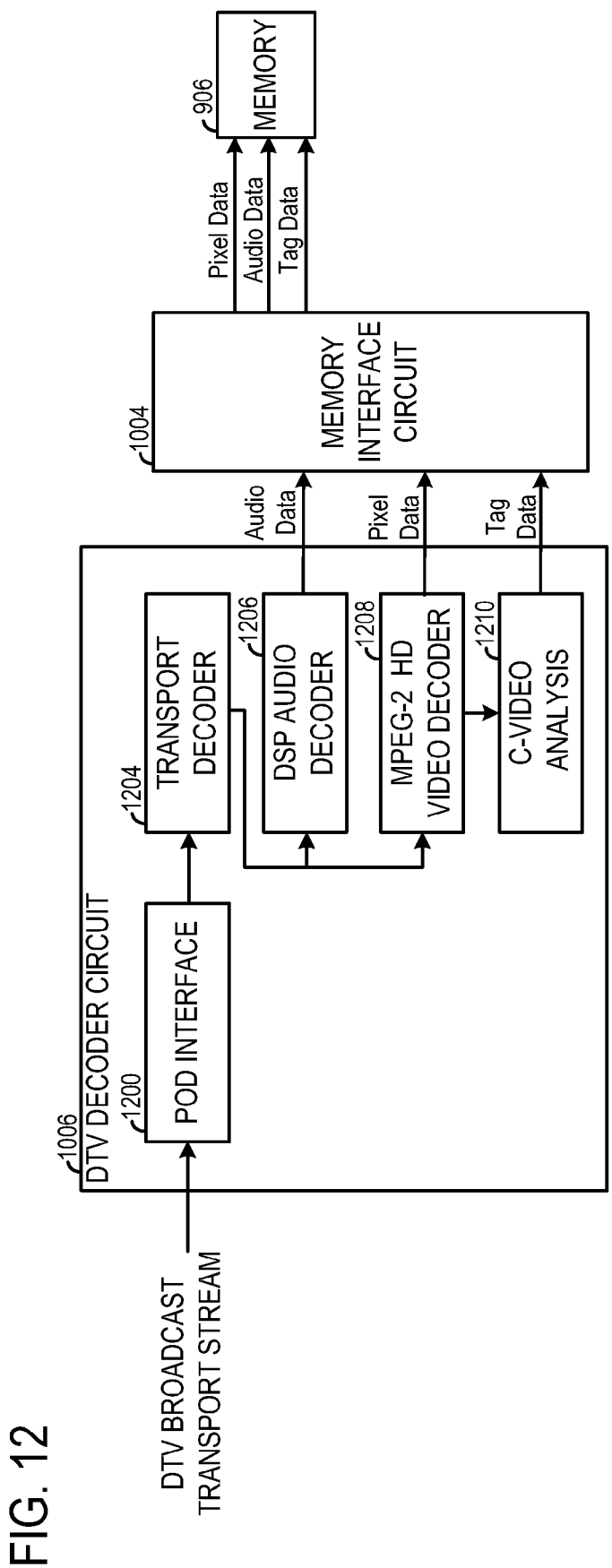

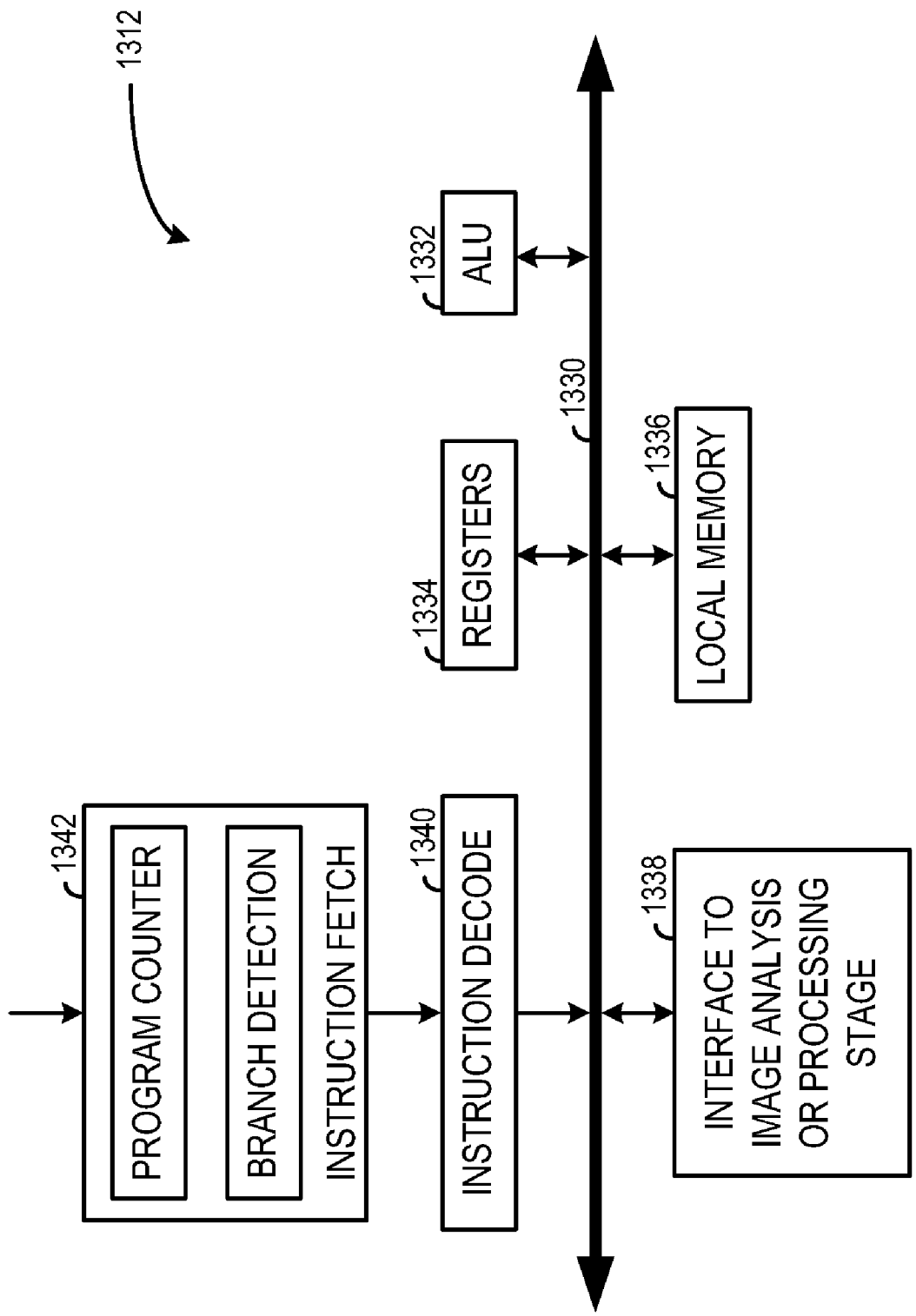

FIG. 18

TIME BANK — 1710

| | Used / Remaining | Borrow | |
|---|---|---|---|
| Frame | Initialize To Allocated Value | Y/N | 1801 / 1800 |
| Stage 1 | Initialize To Allocated Value | Y/N | 1802A / 1803B |
| Stage 2 | Initialize To Allocated Value | Y/N | 1802B / 1803B |
| ⋮ | ⋮ | ⋮ | |
| Stage N | Initialize To Allocated Value | Y/N | 1802N / 1803N |

VIDEO IMAGE PROCESSING WITH PROCESSING TIME ALLOCATION

CROSS-REFERENCE TO RELATED APPLICATIONS

This patent application is a continuation-in-part of, and claims priority to, commonly-assigned U.S. patent application Ser. No. 11/036,462 to Carl J. Ruggiero entitled IMAGE PROCESSING SYSTEM AND METHOD WITH DYNAMICALLY CONTROLLED PIXEL PROCESSING, filed on Jan. 13, 2005, now U.S. Pat. No. 7,308,159 which, in turn, claims the benefit of priority, under 35 U.S.C. Section 119(e), to commonly-assigned Carl J. Ruggiero U.S. Provisional Patent Application Ser. No. 60/537,082, filed on Jan. 16, 2004, each of which is incorporated by reference herein in its entirety.

This patent application is also related to the following commonly-assigned U.S. Patent Applications, filed on even date herewith:

(1) U.S. patent application Ser. No. 11/183,193 of Carl J. Ruggiero entitled VIDEO IMAGE PROCESSING WITH UTILITY PROCESSING STAGE;

(2) U.S. patent application Ser. No. 11/183,160 of Carl J. Ruggiero entitled VIDEO IMAGE PROCESSING WITH PARALELL PROCESSING;

(3) U.S. patent application Ser. No. 11/182,728 of Carl J. Ruggiero entitled VIDEO PROCESSING SYSTEM AND METHOD WITH DYNAMIC TAG ARCHITECTURE;

(4) U.S. patent application Ser. No. 11/182,721 of Carl J. Ruggiero entitled VIDEO PROCESSING SYSTEM AND METHOD WITH DYNAMIC TAG ARCHITECTURE;

(5) U.S. patent application Ser. No. 11/182,719 of Carl J. Ruggiero entitled VIDEO PROCESSING SYSTEM AND METHOD WITH DYNAMIC TAG ARCHITECTURE; and (6) U.S. patent application Ser. No. _____ of Carl J. Ruggiero and John J. Mead entitled VIDEO PROCESSING SYSTEM AND METHOD WITH DYNAMIC TAG ARCHITECTURE;

and each of the above patent applications are incorporated herein by reference in their entirety.

TECHNICAL FIELD

This patent document pertains generally to digital video, and more particularly, but not by way of limitation, to digital video image processing systems and methods.

BACKGROUND

Existing systems and methods for processing digital video typically use separate and independent, fixed image processing blocks, such as for performing fixed de-interlacing, scaling, and other image processing functions. This results not only in increased redundancy and cost, it also potentially results in reduced image quality and processing efficiency. For example, where only pixel data is passed between the stages, processing enhancements achieved by a first stage may be counteracted by later processing by a second stage. For similar reasons, error magnification may occur, such as where processing by the second stage is not well-tuned to processing by the first stage. A further drawback is the sequential flow through the stages such that additional, targeted processing can not be performed. Sub-par image quality, high cost, and processing inefficiencies are problems that are faced in many digital video applications, including high definition television (HDTV). Still further, architectures in prior systems can result in large, multiple silicon implementations that increase cost and/or produce functional redundancies.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 2 schematically depicts a dynamically controllable image processing block.

FIG. 3 depicts various types of changeable classification tag data and processing tag data that may be associated with a pixel or group of pixels, such data being available for example as an input to an image processing block to dynamically tune or otherwise control the image processing block.

FIG. 12 is a block diagram of one example of a DTV decoder circuit.

FIG. 13B is a block diagram of an example of a stage controller.

FIG. 18 depicts one example of a conceptualization of a time bank.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. Aspects of the embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

EXAMPLE 1

Figure 1:
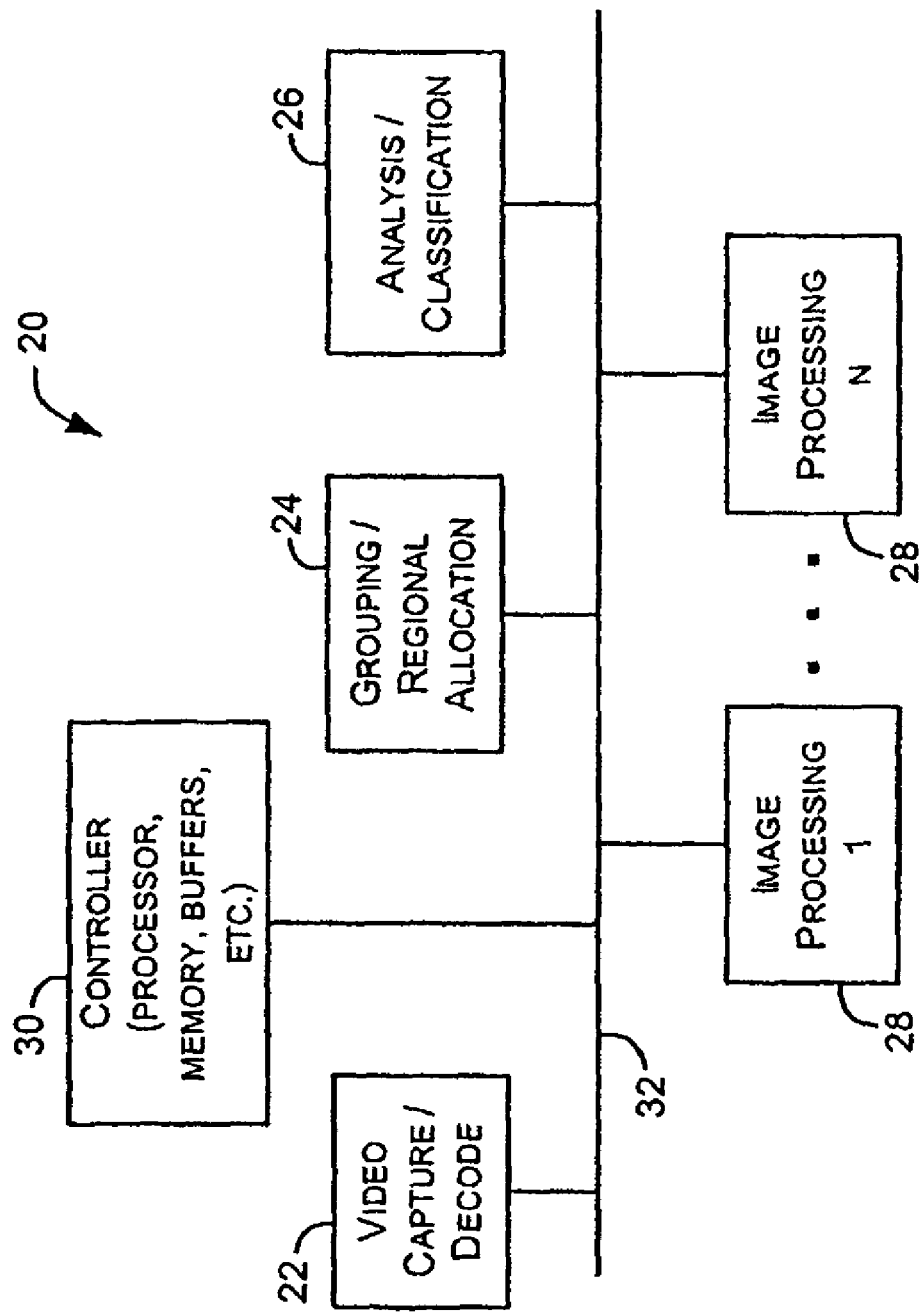
FIG. 1 schematically depicts an example of an image processing system.

FIG. 1 schematically depicts an example of an image processing system 20. The image processing system 20 may include a block 22 for receiving and performing initial processing on an input video signal. The block 22 may be configured to handle analog and/or digital inputs. In the case of analog video, the block 22 may include subcomponents to capture and/or decode an analog video signal, so as to produce corresponding pixels representing the input video frame(s). For example, an analog video decoder including a suitable analog to digital converter (ADC) may be employed to produce pixels representing the input video frame. These pixels may then be clocked into or otherwise applied to the processing pipeline. In typical examples, the pixels are serially clocked into the system. In an example, the system 20 is fabricated within a single contiguous piece of silicon.

For analog video, a device such as the Philips 7119 may be used to provide the pixels to be captured by the processing pipeline. For images captured through an analog to digital converter or from a DVI source, a device such as the Analog Devices 9887 may be used to provide pixels to be captured by the processing pipeline.

Additionally, or alternatively, the block 22 may be configured to handle digital video input. In the case of digital video, a suitable digital video decoder may be implemented within capture/decode block 22 to reconstruct image frames. During the decode process, and at other points during processing, classification data may be associated with the pixels based upon the methods that were used to reconstruct the pixel. Current digital video decoders from companies such as Conexant (CX22490) or LSI Logic (SC2005) may be employed in connection with the embodiments described herein.

The system 20 may also include a block 24 for grouping pixels. After capture, the pixels corresponding to the input video frame typically are allocated to fixed or variable sized groups or regions, such as by using one or more allocation criteria employed at block 24. The allocation criteria may vary considerably. Simple spatial allocations may be employed, such as contiguous or other groupings based on square, rectangular, or other geometric relationships of pixels to one another within the video frame. An object-based allocation system may be employed to group pixels based on the likelihood that the pixels belong to the same object in an image, such as a person's face. Grouping criteria may include spatial blocks such as those used in MPEG video encoding. Yet another grouping example is based on object recognition schemes, in which pattern matching is used to group areas of similar pixels.

Indeed, block 24 may group pixels according to any practicable criteria. Typically, this grouping or regionalizing of the pixels is employed to facilitate analysis or processing of the pixels by system 20. For example, for images of an athletic event with a lot of spectators in the background, the pixels corresponding to this background region could be grouped together (based on shared characteristics). Certain processing steps could then be applied to the grouped pixels as a whole, thus improving the speed or efficiency of the image processing for the video signal. In addition, grouping or regionalizing the video data may greatly improve processing granularity and increase the effectiveness of the dynamic, real-time processing systems and methods described herein.

Classification data (sometimes referred to as "tag data" or "meta data") may be appended to the pixel data, such as by the block 24 or other portions of the system 20, in the form of discrete bits or multi-bit parameters. In an example, discrete bits may be used to flag the presence of a particular characteristic (such as a detected edge in the image). In an example, a multi-bit field may be used to store a numeric value that indicates the quantity of a characteristic present in the pixels (such as motion). The tag data represents some characteristic of the pixel data to which the tag data is appended or associated. The tag data represents a schema for processing the pixel data in an example. The schema may be modified on the fly during processing of the pixel data by tag data generated in prior processing steps.

Although some analysis and classification of pixels may be performed by other parts of system 20, the system may include a block 26 to analyze and classify the pixels being processed. A variety of methods and systems may be employed to perform the classification. The analysis may be performed to detect a variety of one or more pixel characteristics. Such pixel characteristics may include, among other things: motion information; gradients; quantization scale factors; prediction methods employed; inverse discrete cosine transform coefficients; frequency information (e.g., spatial or temporal frequencies); color information (e.g., brightness, contrast, hue, saturation, etc.); whether the pixels include text, graphics or other classifiable elements; whether film mode is being employed; etc. These characteristics commonly change during processing of the pixels, and may be referred to as classification data or tag data.

These characteristics may be determined using any practicable method. For example, frequency information may be obtained by computing the absolute difference between spatially adjacent pixels. Motion information can be generated by comparing pixels to pixels in one or more previous frames and then computing a difference.

As discussed in detail below, grouping block 24 or analysis block 26 may be repeatedly accessed during processing of a pixel or group of pixels. Repeatedly updating classification data allows the system to dynamically track changing characteristics of processed pixels. This, in turn, allows the system to dynamically respond in real time to such changes to dynamically control and enhance image processing.

Image processing system 20 also includes one or more image processing blocks 28. Blocks 28 may be configured to perform a variety of different image processing tasks, including de-interlacing, image interpolation or other resolution changes, color processing, luminance/chrominance separation, noise filtering, boosting, etc. Certain examples may employ separate blocks 28 for de-interlacing, image interpolation, and color processing. Processing at a given processing block can be dynamically controlled according to granular, changeable classification or tag data, as discussed below.

The system 20 may also include a controller 30 to perform or support operation of the other described blocks. The controller 30 may include a processor, memory, frame buffer, or other components as desired. The components of FIG. 1 may be coupled by a bus or other interconnections 32, as appropriate. The depicted components may be implemented as a single integrated chip, or as plural discrete components combined or separated in any practicable way. For example, the controller 30 may be implemented with a separate processor and separate memory chip; the functionality of blocks 24 and 26 could be combined, etc.

Referring now to FIGS. 2 and 3, processing control at an individual processing block (e.g., a de-interlacing block) will be described. FIG. 2 depicts an example of an image processing block 28. One or more pixels 100 are processed at block 28. In one example, block 28 processes pixels 100 according to a control input 102, so as to output processed pixels 104 (pixels'). As indicated, the control effected via input 102 may occur dynamically and may be based on a variety of parameters. Examples of control parameters include, among other things, classification tag data associated with pixels 100 (e.g., motion data, frequency data, etc.), processing information tag data associated with pixels 100 (e.g., filter coefficients employed at another processing step, tag data indicative of an interpolation technique used at another block, tag data indicating whether a previous process was tuned to address sharpness issues, etc.), and/or other control parameters. Classification tag data or processing tag data from other blocks (e.g., fed in from downstream or upstream blocks) may also be used to control processing at a particular block.

FIG. 3 more specifically shows an example of how classification or processing tag data may be associated with one or more pixels. This tag data may be thought of as a multiple-field class 120, in which various types of data may be associated with pixels being processed in the pipeline. Field 122 indicates the pixels with which the other data fields are associated. Classification tag data 124 may be associated with the pixels, such as to describe characteristics or qualities of the pixel or pixels. Classification tag data 124 may include various types of information, including motion data 126, frequency data 128, color data 130, etc. Additionally, or alternatively, class 120 may include processing tag data 140 to indicate or describe processing that has already been performed on the pixel or pixels. Processing tag data 140 may include, by way of example, filtering information 142 from another processing block, parameters or methods 144 employed during de-interlacing, etc.

Regardless of how the tag data is organized or correlated, the tag data for a pixel or pixels need not include only current frame data. The tag data may also or alternatively include historical data (e.g., data from prior video frames) for the pixel. Classification tag data or processing tag data for prior or even subsequent pixels can be fed in to affect processing at a given processing block. Moreover, the classification and processing tag data is capable of dynamically changing as pixels move through the processing pipeline. This dynamically changing control data may be employed to improve image processing, through the mechanism of dynamically feeding the changing control data forward or backward in the processing pipeline. This produces dynamic feed-forward and feedback effects on image processing of other pixels, or on image processing of the same pixels at subsequent processing blocks.

Figure 4:
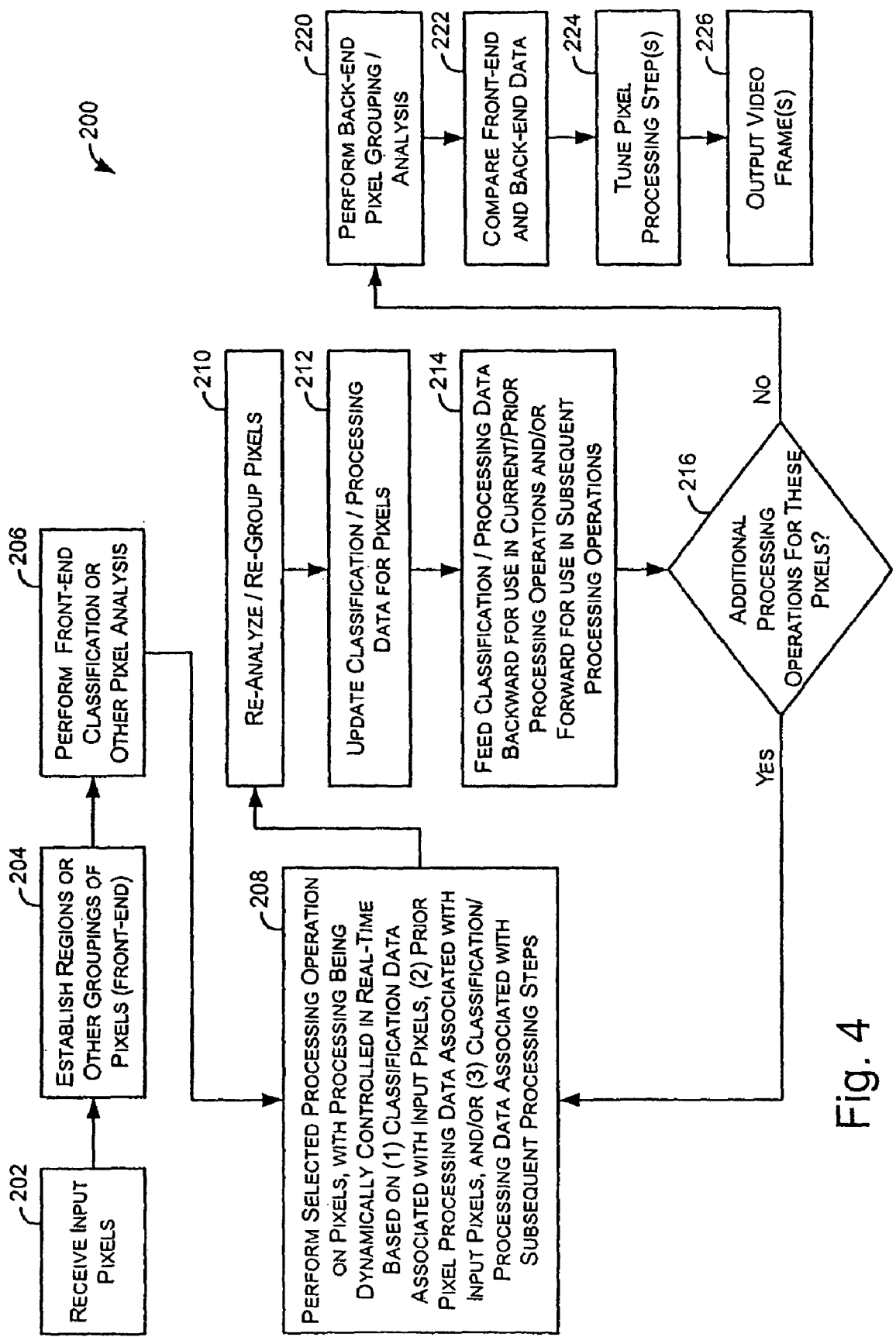
FIG. 4 depicts an exemplary implementation of a method for processing digital images.

FIG. 4 shows an example of an image processing method 200, aspects of which may be implemented using the systems or components described in this document, or independently thereof. At 202, method 200 may include receiving or otherwise obtaining the input pixels to be processed. This may be accomplished via the previously described analog/digital capture and decode features described above (e.g., capture/decode block 22 of FIG. 1). The received pixels may then be appropriately grouped or regionalized at 204, as previously discussed with reference 30 to FIG. 1. The pixels may also be analyzed to obtain desired classification data, as shown at 206. Such classification data may include any of the previously discussed pixel classifiers, including motion data, frequency data, color information, gradient data, etc. The grouping and analysis of steps 204 and 206 may be referred to as front-end operations or tasks or analysis, because in the present example they are performed before any image processing of the pixels (e.g., before de-interlacing, image interpolation operations, etc.)

At 208, an image processing operation (e.g., de-interlacing, image interpolation, noise filtering, etc.) is performed on the input pixels. As previously discussed, the image processing operation may be dynamically controlled in accordance with classification or processing tag data associated with the pixels (e.g., classification tag data 124 and processing tag data 140 of FIG. 3).

One use of classification tag data to dynamically tune image processing operations may be understood in the context of de-interlacing. In certain examples of the present system, the de-interlacing method employed at any given point may be highly dependent upon the degree of motion detected in the pixels to be processed. As previously explained, the motion may be detected by assessing temporal changes for a pixel occurring over plural video frames. This motion information is typically associated with the pixel, for example through use of a multi-field class, such as class 120. The motion information embedded within the class fields may be used to dynamically control the de-interlacing operation or to select the appropriate de-interlacing algorithm. One de-interlacing operation might be appropriate for pixels or regions with a high degree of motion, while another de-interlacing operation (or a modified version of the first operation) might be more appropriate for static pixels or regions of the image.

The processing at step 208 may also be dynamically controlled based on prior processing of the pixels being fed into the processing operation. For example, the associated processing data (e.g., processing data 140) might indicate that certain algorithms had been applied to the pixels that are known to produce blurring effects in the presence of motion. This knowledge could then be used to tune the instant processing operation so as to enhance the sharpness of certain pixels, such as edges of moving objects.

Classification tag data or processing tag data associated with other processing operations, or with pixels other than those being processed at step 208, may also be employed to control the image processing operation at step 208. As shown in FIG. 4, after various post processing operation steps (e.g., at 210, 212, 214 and 216), another processing operation may be performed at 210. FIG. 1 shows a similar scheme of pipeline processing, in which a number of different processing operations (i.e., corresponding to the different image processing blocks 28) may be performed in a desired sequence. In the method of FIG. 4, for each pass through 208, a different processing operation may be performed. For example, a de-interlacing operation might be performed in a first pass, with image interpolation, color processing and nose filtering being performed in later passes.

For a given image processing operation, classification tag data or processing tag data arising at one of the other processing operations in the pipeline may be employed to affect the processing operation. In a pipeline with de-interlacing, image interpolation and color processing operations, for example, the classification tag data for output pixels from the image interpolation process may be used to control the de-interlacing processing. In such a setting, analysis of the pixels coming out of the image interpolation process may reveal image quality issues that are best handled by adjusting the de-interlacing processing parameters. Processing tag data may also be fed back or forward through image processing operations in the pipeline. In the above example, processing tag data from the image interpolation block may reveal repeated use of filter coefficients to improve sharpness. This processing tag data may be fed forward or backward (upstream or downstream) through the image processing pipeline, so in the event that sharpness can be more effectively handled in other parts of the pipeline, that processing task is shifted to such other blocks.

In FIG. 4, after the selected processing operation, the output pixels from the processing operation may be re-analyzed or re-grouped at 210. Typically, classification tag data for a pixel or pixels changes as a result of the applied processing operation. For example, frequency information may change, gradients may change, motion vectors may be modified, etc. The classification tag data for a pixel or pixels may then be updated at 212. Additionally, or alternatively, processing information for the pixels may be updated at step 212. Indeed, any classification or processing tag data information associated with the pixels may be updated, for example by updating the relevant fields of a multi-field class such as class 120 (FIG. 3).

Thus, classification and processing tag data for a given pixel or pixels typically dynamically changes as the pixels move through the processing pipeline: pixel characteristics change, different processing parameters and algorithms are applied during processing, etc. This changing classification or processing tag data information can be fed forward and backward through the processing pipeline to dynamically tune the processing operations occurring at various points in the system. Indeed, at 214, the updated classification or processing tag data information arising from the just-completed processing operation (at 208) is passed to desired portions of the processing pipeline, so as to have potential feed-forward and feedback effects on image processing operations. At 216, if additional processing operations are to be performed on the pixels (e.g., at a downstream block in the processing pipeline), method 200 returns to 208 to perform the next selected processing operation.

If no additional processing operations are to be performed, a "back-end analysis" or comparison may be performed at 220 and 222. This may involve performing additional analysis to obtain updated classification tag data information for the final output pixels. The results of this back-end analysis may be compared with the front-end tag data obtained at 204 and 206 in order to further dynamically tune or control any of the processing operations occurring within the processing pipeline. For the exemplary system of FIG. 1, for example, tag data or other characteristics of the initial input pixels may be compared with a classification of pixels comprising the final output video frames, such as to assess whether processing objectives were achieved. This comparison would then be used to dynamically tune the processing operations performed by processing blocks 28 in the image processing pipeline, as shown at 224. After processing, the video frames are output as shown at 226. In another example, as discussed further below, the back-end analysis is used to determine whether any available processing time remains for further processing the same video frames, if desired.

Figure 5:
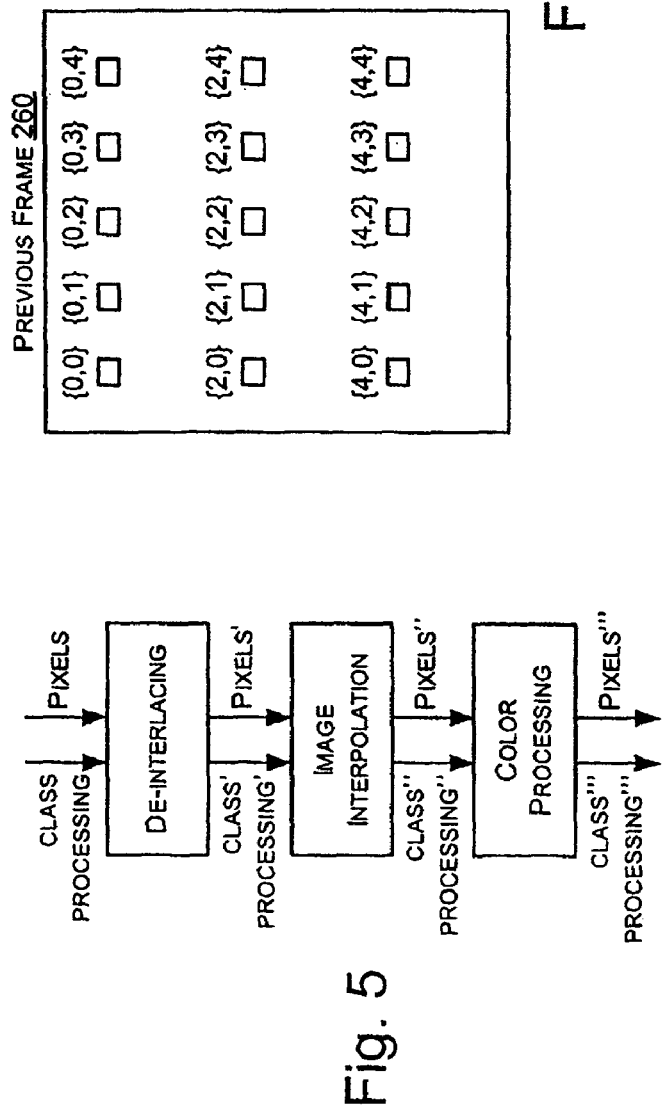
FIG. 5 depicts an exemplary processing pipeline including dynamically controllable processing blocks, such as for performing de-interlacing, image interpolation, or color processing operations.

The described image processing systems and methods typically includes de-interlacing, image interpolation and color processing operations. These operations may be performed sequentially in a processing pipeline, as schematically depicted in FIG. 5. As previously discussed, input pixels are applied to each block, and the relevant processing operation is dynamically controlled based on classification tag data information or processing tag data information, which typically changes as the pixels are processed and move through the processing pipeline.

As previously discussed, the described system and method typically includes a de-interlacing block or processing operation. Many video signals are commonly provided in an interlaced format, in which every other horizontal line of an image scene is scanned and transmitted for a given video frame. Even- and odd-numbered scan lines are presented in an alternating succession of video frames. As a result, in a system in which sixty video frames per second are displayed, video frames containing the even-numbered lines are displayed thirty times and video frames containing the odd-numbered lines are displayed thirty times. In such an interlaced signal, a given video frame only contains 50% vertical resolution. (Sometimes, this is alternatively conceptualized as being two interlaced fields of the same video frame).

Figure 6:
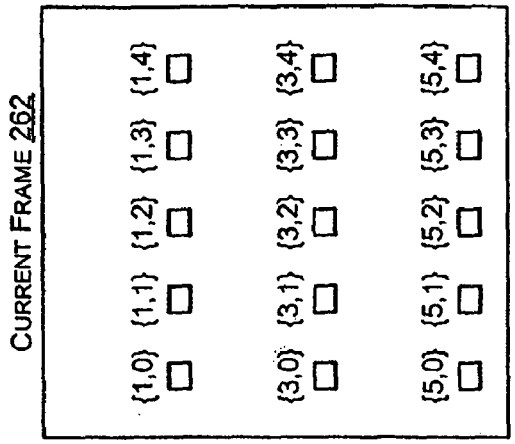
FIGS. 6 and 7 depict interlaced video frames (the interlacing sometimes conceptualized as different fields of the same image frame) and a dynamically controllable processing block for performing de-interlacing operations.

FIG. 6 illustrates operation of an exemplary de-interlacing block, in which interlaced video frames are converted into a signal having full vertical resolution. Frames 260 and 262 are video frames of an interlaced video signal. As indicated, frame 262 may be referred to as the current frame, while frame 260 may be referred to as the previous frame. Each frame contains a plurality of pixels denoted with the legend {row, column}, indicating the row and column position of the pixels within the frame.

To construct frames having full vertical resolution, various methods may be employed. The missing rows of a current frame may simply be obtained and added in from a previous frame in a method known as field meshing. Meshing can provide high quality de-interlaced images, particularly when the pixels involved are static or exhibit a low degree of motion. Additionally, or alternatively, various types of interpolation may be employed, in which a target pixel is interpolated based on properties of one or more neighboring pixels. For example, the missing pixel {2,2} of current frame 262 may be interpolated by averaging or otherwise interpolating properties (e.g., brightness, hue, saturation, etc.) of neighboring pixels {1,2} and {3,2}, or of a larger set of adjacent pixels, such as pixels {1,1}, {1,2}, {1,3}, {3,1}, {3,2} and {3,3}.

Figure 7:
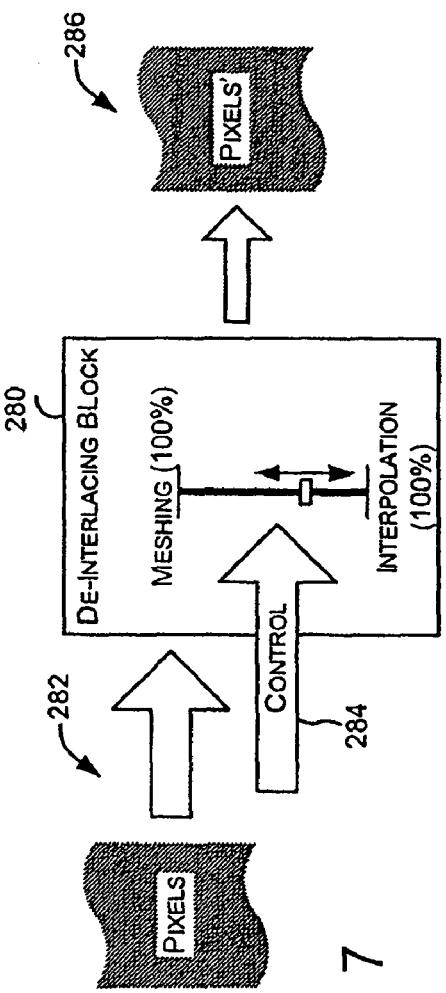

FIG. 7 depicts an exemplary de-interlacing block 280 that may be configured to receive input pixels 282, to perform a de-interlacing operation upon the pixels based upon an applied control signal 284, and to output processed pixels 286 in a de-interlaced format. De-interlacing block 280 may be implemented in a system such as that shown in FIG. 1, in which case the de-interlacing block 280 would be one of the processing blocks 28 in the processing pipeline of FIG. 1.

Similar to the processing block described with reference to FIG. 2, the specific processing operation or methods being performed by block 280 (e.g., de-interlacing) may be dynamically varied in real-time, such as by using classification or processing tag data associated with the input pixels 282. Additionally, or alternatively, classification or processing tag data associated with pixels other than pixels 282, or associated with other processing blocks in the pipeline, may be used to dynamically vary the de-interlacing operation. For example, selecting between field meshing and interpolation methods to reconstruct missing pixels may be determined to a large extent by motion classification tag data. Meshing may be undesirable for moving pixels because meshing can create a "tearing" or "feathering" effect, due to the temporal shifts occurring between successive interlaced video frames. Therefore, interpolation may be more desirable for pixels having a high degree of motion.

In contrast, static or relatively static images may lend themselves more readily to de-interlacing using a non-interpolative method, such as field meshing. Meshing in some instances can produce sharper images, and may thus be preferable for de-interlacing low motion images (or one or more low motion portions of a particular image). In one example, block 280 is configured to not only select between interpolative and non-interpolative methods, but also to blend the methods with desired weighting where appropriate, such as by using classification or processing tag data or other parameters of the control signal 284. In the depicted example, the control signal 284 can cause deployment of a pure meshing method, a purely interpolative method, or any blending of those two extremes.

Similarly, any number of de-interlacing methods may be selected or selectively combined based on classification tag data or processing tag data, including field mixing with a finite impulse response (FIR) filter, use of a median filter, line doubling, use of vertical temporal filters, averaging filters, etc. Generalizing to a de-interlacing processing block with N alternate de-interlacing methods or algorithms, the present system may be employed to combine or cross-fade between the alternate methods as desired, based on the rich control data available in the processing tag data or classification tag data. Some of the alternate methods may be weighted or emphasized more heavily than others, one particular method may be selected to the exclusion of others, etc. In other words, the classification tag data or processing tag data may be used to control the extent to which each available de-interlacing method participates in the de-interlacing process to produce a target pixel or pixels.

This example of FIG. 7 may be used to illustrate how classification tag data and processing tag data may be fed forward or backward to dynamically tune processing in real-time. Assume that input pixels 282 are from a particular region or group of a video frame, and that classification tag data associated with pixels 282 indicates a high degree of motion in that portion of the video frame. The processing at de-interlacing block 282 could then be dynamically adjusted to construct full vertical resolution using a method weighted more heavily toward interpolation, perhaps even a purely interpolative method, such as to avoid feathering or other unwanted artifacts.

As previously discussed, interpolative de-interlacing methods can cause blurring effects or other loss of sharpness. Continuing with the above example, if a loss of sharpness were to occur due to use of interpolation during de-interlacing, that would be reflected in the tag data obtained for the output pixels (e.g., by analysis/classification block 26 of FIG. 1). The associated tag data would flow downstream to the next processing block, which can then factor in the lack of sharpness in tuning its processing algorithm. In alternate examples, classification data may be sent upstream.

Additionally, or alternatively, information about the de-interlacing operation itself could be reported upstream or downstream. In the present example, the reported processing tag data information would indicate that a highly interpolative method was used for de-interlacing. Other processing operations could be dynamically tuned in response to such processing tag data information, such as to compensate for potential sharpness loss resulting from the de-interlacing operation.

As another example, classification or processing tag data may also be fed upstream or downstream to control processing blocks or operations that vary the resolution of input pixels (e.g., image interpolation). Resolution changes may be applied differently to different regions of the input video frame, and may include reduction in resolution or increases in resolution (e.g., upconversion). The method or methods employed to vary the resolution may be dynamically controlled based on the input classification tag data or processing tag data. Typically, the dynamic control causes dynamic variation of image scaling coefficients used to derive target pixels. The dynamic control of the coefficients may be employed whether the image is being scaled up or down, and may further be employed in connection with linear and non-linear methods.

Figure 8:
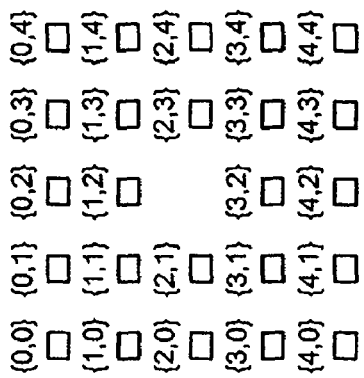
FIG. 8 depicts, in the context of an image interpolation processing operation, a pixel grid and a target pixel to be interpolated from one or more known pixel values in the grid.

For example, upconversion may be accomplished by sampling the input pixels, and applying the sampled values to a new larger grid of pixels. This process can involve pixel replication using "nearest neighbor" methods, though interpolation will typically be employed. One typical method is a cubic convoluting interpolation method, employing a multiple coefficient filter. For example, FIG. 8 depicts a grid of pixels. At the center of the grid is a target pixel whose value is to be determined. Interpolative methods may determine this pixel by assessing the values of neighboring pixels. The value of a nearby or neighboring pixel may be taken into account, as well as its distance from the target pixel.

Cubic convoluting interpolation typically involves interpolating based on four known pixels. For example, in the horizontal direction in FIG. 8, the target pixel may be interpolated from the values of known pixels {2,0}, {2,1}, {2,3} and {2,4}, such as by taking into account the values of the known pixels and their distances from the target pixel. Image scaling coefficients may also be employed, such as to more heavily weight certain pixels or to filter out noise or other high frequency artifacts in the upconverted image. The interpolation method or methods are typically applied in both the horizontal and vertical directions to determine values of target pixels.

In one example, classification tag data or processing tag data associated with the pixels, or from other sources, may be used to dynamically tune the image interpolation methods. For example, one or more interpolation coefficients may be determined according to or based on motion, gradient or frequency information associated with the input pixels. If prior processing algorithms have provided sub-optimal sharpness enhancement, for example, then filter coefficients may be selected for image interpolation to preserve or enhance sharpness in portions of the image.

The present dynamic control and feed-forward and feedback features are also applicable to color processing or other image processing operations. For example, in the context of color processing, the changing classification or processing tag data associated with one or more input pixels can be used to control, adjust or select one or more algorithms used to vary brightness, contrast, hue, saturation, color space conversions, etc., of the input pixels. Overall brightness of pixels may be reduced in response to motion tag data information for one or more pixels. Motion history for a pixel or pixels may be used to identify and correct artifacts associated with occlusion problems. In addition to, or instead of, basing control on tag data associated with the input pixels, control may be based on classification or processing tag data fed in from other portions of the processing pipeline (via feedback or feed-forward configurations).

EXAMPLE 2

Figure 9:
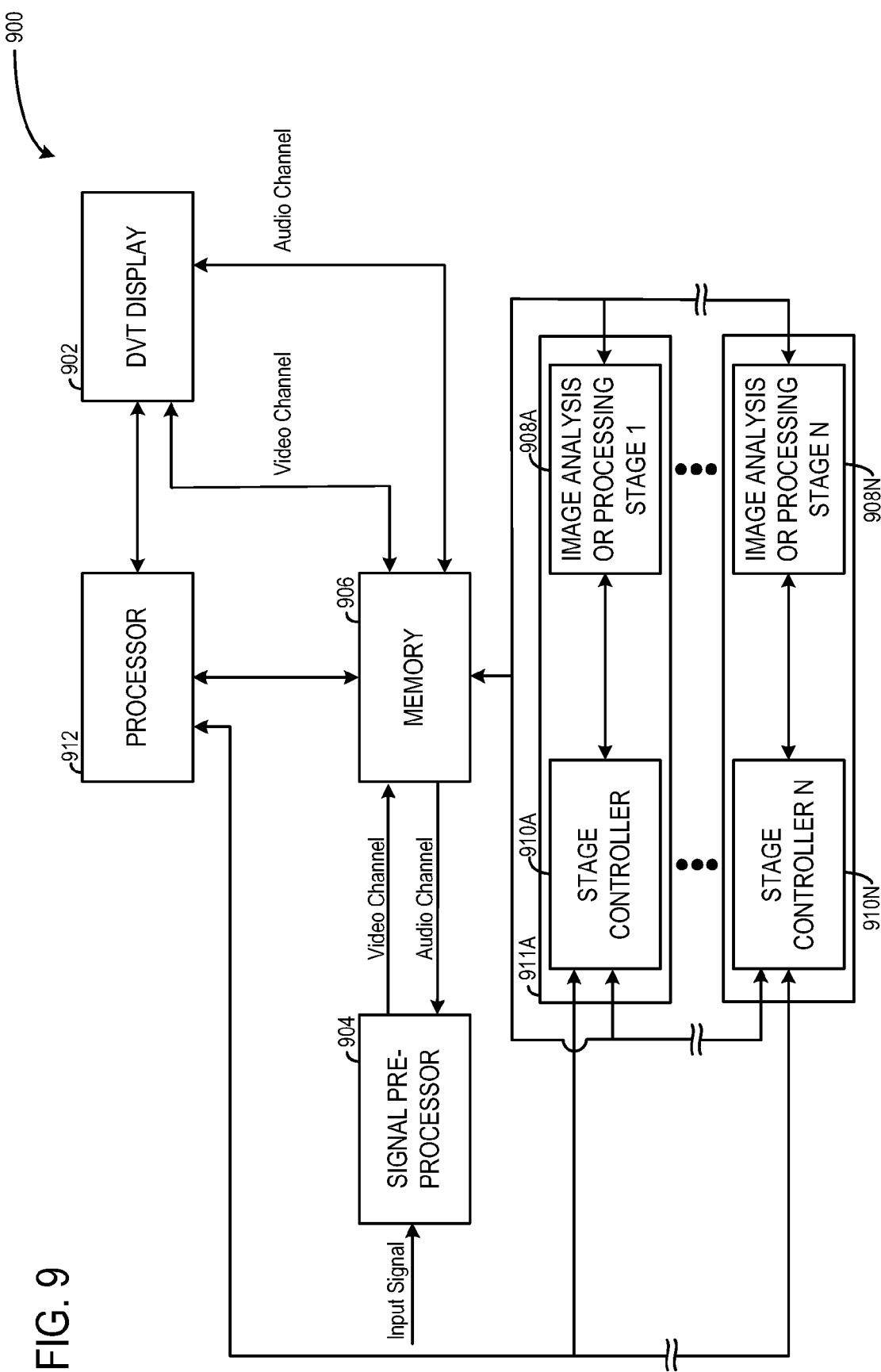
FIG. 9 is a block diagram of one example of a conceptualization of portions of a system for processing a digital video signal, such as for viewing on a high-definition television (HDTV) or like display.

FIG. 9 is a block diagram of one example of a conceptualization of portions of a system 900 for processing a digital video signal, such as for viewing on a high-definition television (HDTV) or like display 902. In this example, the system 900 includes a signal preprocessor 904. The signal preprocessor 904 receives and preprocesses one or more input signals, such as a digital video signal from a digital videocamera or a digital video signal of a digital television broadcast. An output of the signal preprocessor 904 is coupled to an input of a memory 906. The video pixel data and accompanying audio data of the resulting preprocessed signal is typically provided to and stored in a respective designated portion of the memory 906. Image analysis or processing stages 908A-N are also coupled to the memory 906. The pixel data stored in the memory 906 undergoes image analysis or processing by one or more of the stages 908A-N. An accompanying stage controller 910A-N is respectively coupled to each one of the stages 908A-N to control their operation. Each stage controller 910A-N and its corresponding paired image analysis or processing stage 908A-N can be conceptualized as forming a corresponding analysis/processing pipeline segment 911A-N. After performing its respective image analysis or processing, each of the stages 908A-N typically returns its processed pixel data to the memory 906 for storage and to permit use by other stages 908A-N.

In the example of FIG. 9, audio and video channel outputs of the memory 906 are coupled to respective inputs of the display 902. The memory 906 ultimately provides the audio data and the processed pixel data to the display 902 for generating and displaying a high quality image and providing accompanying sound. In the example of FIG. 9, a processor 912 is coupled to the memory 906, to the display 902, and to the stage controllers 910A-N. The processor 912 implements a digital television software stack, and provides a user interface allowing a user to control operation the display 902, such as by adjusting brightness, contrast, etc. In one example, the processor 912 is a model 24Kc™ processor from MIPS Technologies, Inc. of Mountain View, Calif. As discussed above and further described below, the signal preprocessor 904 and image processing stages 908A-N typically generate sharable analysis, classification, or processing tag data—which is non-identical to the pixel data. This tag data is communicated and stored in its designated portion of the memory 906. Among other things, the stored tag data generated by one of the blocks depicted in FIG. 9 is usable by other blocks, such as by different analysis/processing pipeline segments 911A-N. Using such sharable stored tag data may reduce redundancy in the various blocks, and also may increase image quality and image processing efficiency, such as by permitting dynamic real-time control as described above.

Figure 10:
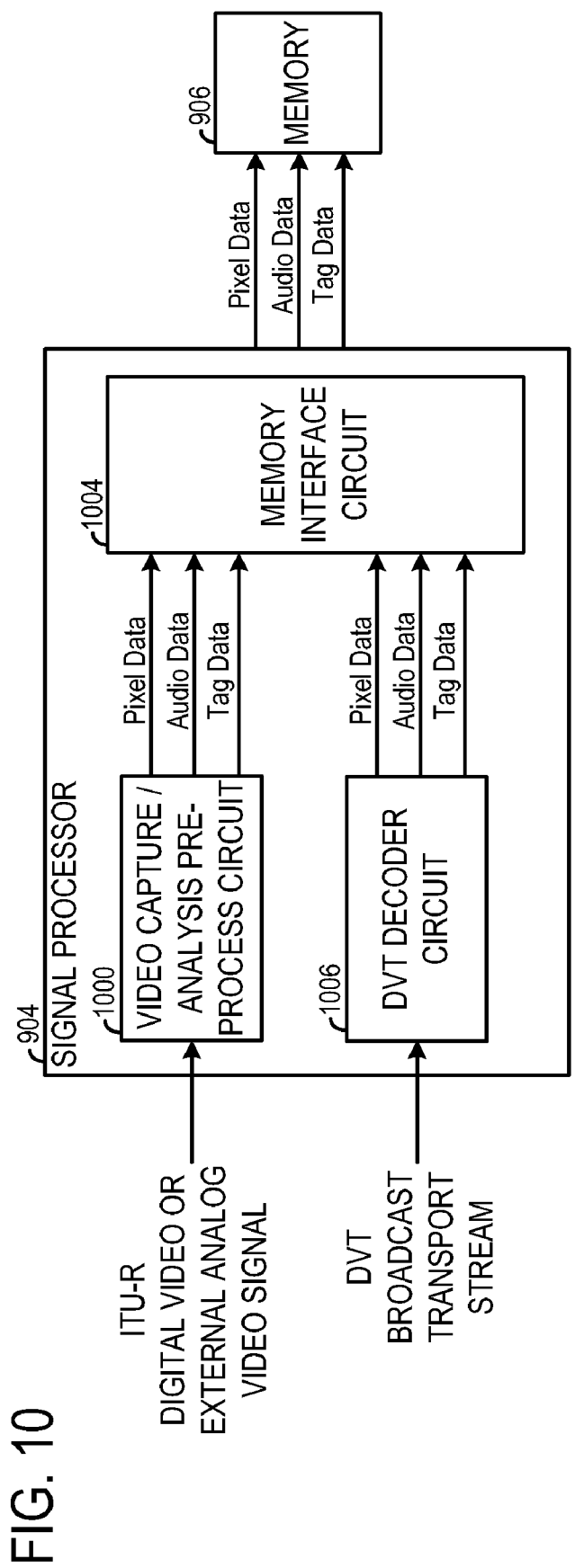
FIG. 10 is a block diagram of one example of a signal preprocessor coupled to a memory.

FIG. 10 is a block diagram of one example of the signal preprocessor 904 coupled to the memory 906. In this example, the signal preprocessor 904 includes two input channels. A first channel includes a video capture/analysis/preprocess circuit 1000 that receives audio and video input from a digital video camera source, such as an external ITU-R digital audio/video signal or an external analog video signal. A pixel data output of the video capture/analysis circuit 1000 is coupled to an MI-64 bridge or other memory interface circuit 1004, which, in turn, delivers the pixel data to the memory 906, such as for storage in a frame buffer in the memory 906. A tag data output of the video capture/analysis circuit 1000 is coupled to the memory interface circuit 1004, which, in turn, delivers the tag data to the memory 906, such as for storage in a designated tag data portion of the memory 906. An audio output of the video capture/analysis circuit 1000 is coupled to the memory interface circuit 1004, which, in turn, delivers the audio data to the memory 906, such as for storage in an audio buffer in the memory 906.

In the example of FIG. 10, a second channel of the signal preprocessor 904 includes a digital television (DTV) decoder circuit 1006 that receives a broadcast DTV transport stream. A pixel data output of the DTV decoder circuit 1006 is coupled to the memory interface circuit 1004, which, in turn, delivers the pixel data to the memory 906, such as for storage in a frame buffer in the memory 906. A tag data output of the DTV decoder circuit is coupled to the memory interface circuit 1004, which, in turn, delivers the tag data to the memory 906, such as for storage in a designated tag data portion of the memory 906. An audio data output of the DTV decoder circuit is coupled to the memory interface circuit 1004, which, in turn, delivers the audio data to the memory 906, such as for storage in a designated audio data portion of the memory 906.

Figure 11:
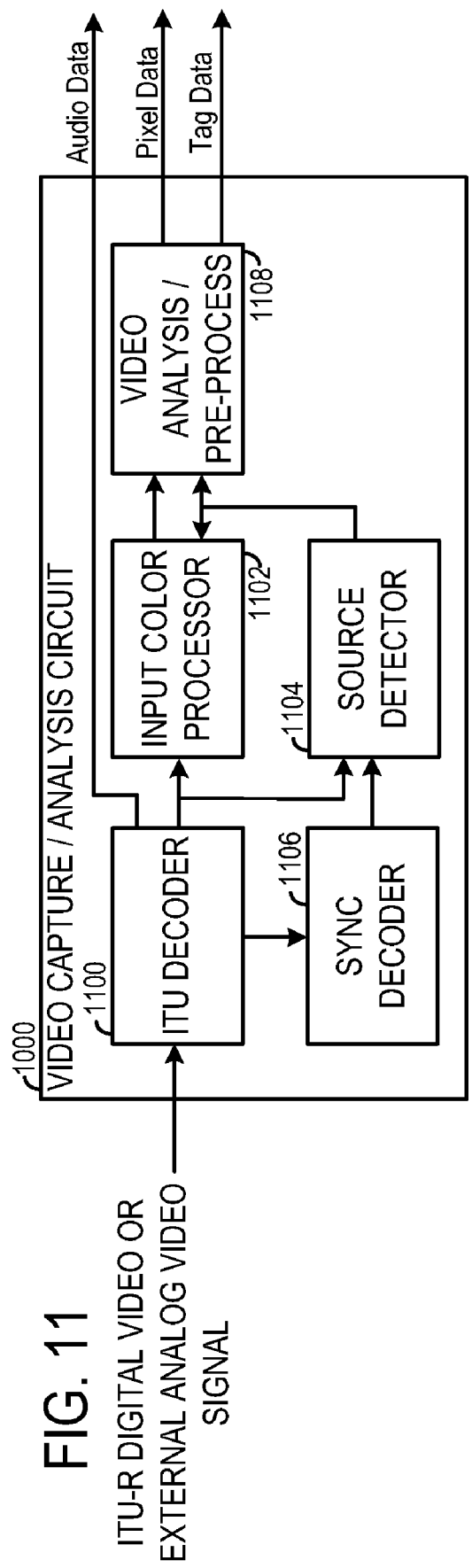
FIG. 11 is a block diagram of one example of a video capture or analysis circuit.

FIG. 11 is a block diagram of one example of the video capture or analysis circuit 1000. In the example of FIG. 11, the video capture or analysis circuit 1000 receives an analog or digital video signal, such as an ITU-R digital video signal received at ITU decoder circuit 1100. The ITU decoder circuit 1100 processes this input signal to extract a pixel data signal, an audio data signal, and a signal that includes synchronization information. Each temporally distinct image frame of the digital video signal is made up of a large number of discrete pixels. Each pixel is typically represented by a pixel data value indicative of color intensity (e.g., having red, green, and blue components). The pixel data values may be encoded in a number of different ways. As an illustrative example, the pixel data values may be encoded using 4:2:2 sampling of studio digital video in accordance with ITU Rec. 601.

The pixel data signal is output by the ITU decoder 1100 to an input color processor 1102 and a video source detector 1104. A synchronization decoder circuit 1106 receives the signal including synchronization information from the ITU decoder 1100 and provides a resulting synchronization signal to the source detector 1104. The source detector 1104 uses the synchronization signal and the pixel data it receives to determine the source of the digital video signal. Such information is provided to the input color processor 1102 to enable it to perform input color processing appropriate to the particular digital video source, and may also be provided to video analysis/preprocess circuit 308 (or to subsequent blocks as tag data). The input color processor 1102 provides resulting color-processed pixel data to a video analysis or preprocess circuit 1108.

The video analysis/preprocess circuit 1108 analyzes or processes the pixel data. In one example, this analysis includes performing a motion estimation, such as to determine both a direction and a velocity of motion of a pixel or group of pixels between temporally different (e.g., adjacent) image frames. In other examples, the video analysis/preprocess circuit 1108 measures spatial frequency information, color information (e.g., average brightness of a pixel's (or group of pixels) color components, or whether the signal source is analog, digital, or digital grafted onto an analog carrier (e.g., a DVD's digital video signal output over S-video). The analysis produces tag data that is non-identical to the pixel data. For example, motion estimation analysis produces tag data that represents the motion vectors of a pixel or group of pixels. Such information in the tag data is not represented in the pixel data. In one example, the video analysis/preprocess circuit 1108 also performs noise filtering, such as coring, median filtering, or amplitude suppression.

FIG. 12 is a block diagram of one example of the DTV decoder circuit 1006. In this example, the DTV decoder circuit 1006 includes a Point of Deployment (POD) interface circuit 1200 for receiving a DTV broadcast transport stream, such as a packetized MPEG-2 transport stream including one or more programs being broadcast. The POD interface circuit 1200 may include a technology or system operator-specific decoder, such as, for example, for interfacing with a digital cable television "smart card" (which may vary between different cable television providers), a satellite television smart card (which similarly may vary between providers), etc. The transport stream is decoded by transport decoder 1204, such as to obtain audio and video information. In an example, the transport decoder 1204 comprises an MPEG-2 decoder as described and specified in International Organization for Standardization (ISO) 13818-1. The transport decoder 1204 provides audio information to a digital signal processor (DSP) audio decoder 1206. The audio decoder 1206 decodes an audio component of the transport stream. The audio decoder 1206 provides resulting audio information to the memory interface 1004, which, in turn communicates such audio information to the memory 906 for storage and audio output in conjunction with the image display. The transport decoder 1204 also provides video information to MPEG-2 high definition (HD) video decoder 1208. The video decoder 1208, in an example, is a Motion Picture Experts Group (MPEG) coder that compresses the video signal according to one of the MPEG formats, e.g. MPEG-1, MPEG-2, MPEG-4, MPEG-7, etc. In the MPEG-2 example, the bit rate of a standard definition 4:2:0 video signal is compressed to about 3-15 Mbits/second. The compression takes advantage of spatial and temporal redundancy in a same frame and across frames. The compression further takes advantage of an eye's limited response to fine spatial detail. For example, the eye does not perceive as much fine spatial detail near object edges and around scene changes than in an interior of an object or during a still scene. Accordingly, the compression uses intra-frame discrete cosine transform coding and motion-compensated inter-frame compensation. The video decoder 1208 provides resulting pixel data to the memory interface circuit 1004 which, in turn, communicates such pixel data to the memory 906 for storage before subsequent processing and image display. The video decoder 1208 also provides the pixel data to component video (c-Video) analysis circuit 1210. C-video analysis provides the ability to analyze separately the three components. The three components are R'G'B' in the NTSC color coding standard and $Y'P_BP_R$ in the PAL color coding standard. The c-video analysis may detect the type of incoming signal for example, the scanning mode progressive (p), segmented frame (psf), and interlaced (i). The analysis may further detect the scanning sequence, e.g., left to right and from top to bottom. The c-video analysis may further analyze the sync information, which is bi-level for SDTV formats and tri-level for HDTV formats. An example of component video analysis is shot boundary detection. Each video frame is processed to a representative a two-dimensional compact feature vector. An iterative clustering algorithm can used to detect scene cuts and gradual transitions. Moreover, the c-video analysis is used with standard definition television (SDTV) or enhanced definition television (EDTV). SDTV typically has less than 750,000 pixels. Some signal standards for SDTV and EDTV include 720×480i, 59.94 Hz; 720×480p, 59.94 Hz; 720×480i, 60 Hz; 720×480p, 60 Hz; 720×576i, 50 Hz; and 720×576p, 50 Hz. The first number, in this case, 720, is the number of horizontal pixels. The second number is the number of vertical pixels. The "i" represents an interlaced signal. The "p" indicates a progressive signal. The final number is the frame rate or clock speed of the sequence of fields or frames. The frame rate indicates the speed at which frames are output to the display. The c-video analysis is further used with high definition television (HDTV), which has 750,000 pixels or greater. Some signal standards for HDTV include 1280×720p, 50 Hz; 1920×1080p; 23.98 Hz; 1280×720p, 59.94 Hz; 1920×1080 psf, 23.98 Hz; 1280×720p, 60 Hz; 1920×1680i, 50 Hz; 1920×1080p, 24 Hz; 1920×1080i, 59.94 Hz. The c-video analysis may further detect the aspect ratio of the received data and set the display aspect ratio. In an example, the c-video analysis generates tag data using compression information (e.g., quantization information, type of frame information, compression parameters, etc.). The c-Video analysis circuit 1210 provides resulting tag data to the memory interface 1004, which, in turn, provides such tag data to the memory 906 for storage or use by other blocks, such as the image analysis or processing stages 908N.

Figure 13A:
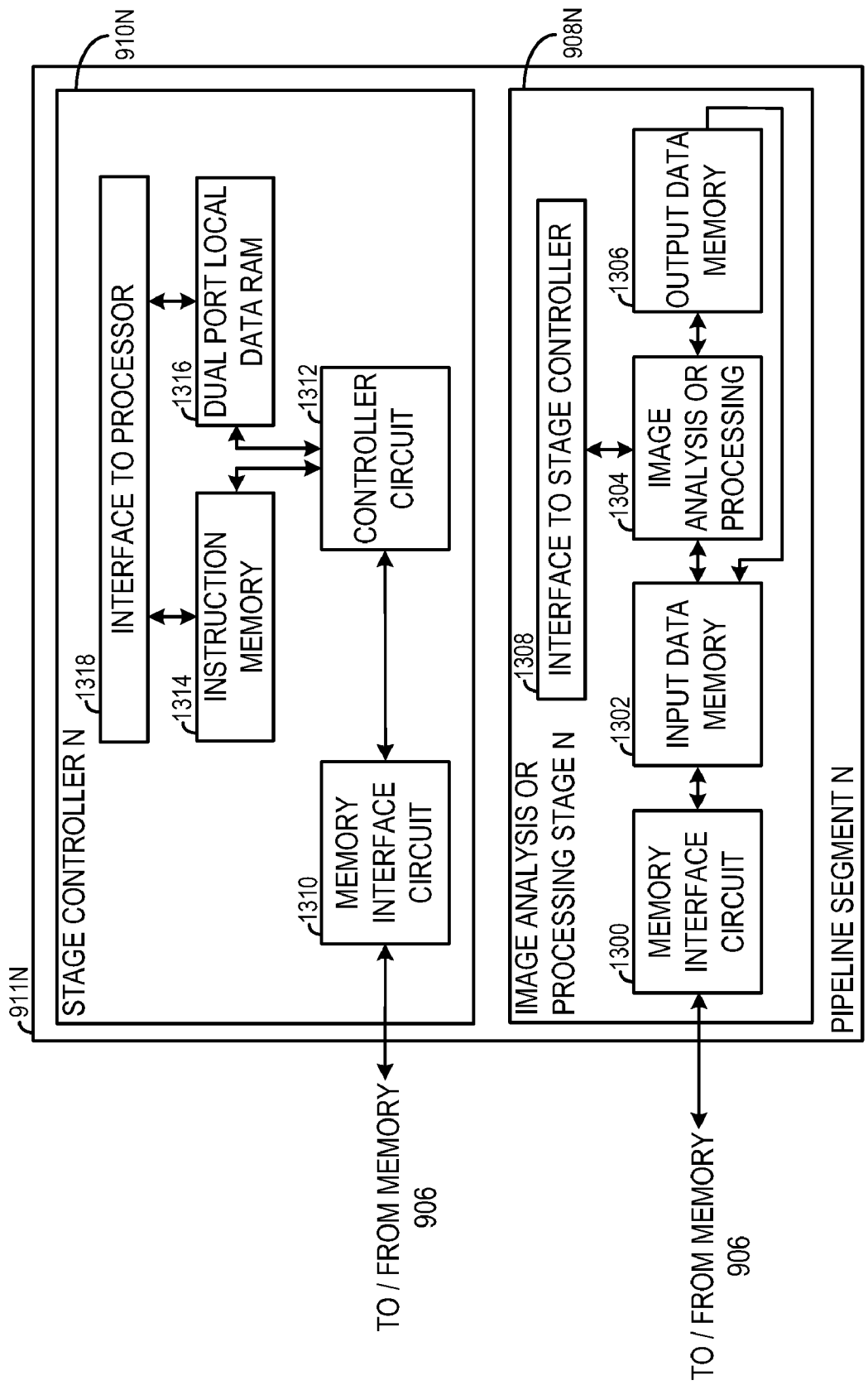
FIG. 13A is a block diagram of one example of an exemplary analysis or processing pipeline segment, which includes a stage controller and a corresponding image analysis or processing stage paired therewith.

FIG. 13A is a block diagram of one example of an exemplary analysis or processing pipeline segment 911N, which includes a stage controller 910N and a corresponding image analysis or processing stage 908N paired therewith. In this example, the image analysis or processing stage 908N includes a memory interface circuit for reading or writing pixel data or tag data to or from the memory 906. Pixel data or tag data that is read from the memory 906 can be stored in a local input data memory circuit 1302, which is coupled by a bus to the memory interface circuit 1300. An input of an image analysis or processing circuit 1304 is coupled by a bus to the input data memory 1302 to receive pixel data or tag data therefrom. After performing image analysis or processing on the received pixel data or tag data, resulting analyzed or processed output pixel data or tag data is provided via a bus to an output data memory 1306, where it is stored. The output data memory 1306 is coupled by a bus to the memory interface circuit 1300, through which the analyzed or processed output pixel data or tag data is communicated to the memory 906. The image analysis or processing stage 908N includes an interface 1308 to the corresponding stage controller 910N with which it is paired. The interface 1308 will typically include one or more registers, such as for storing instructions or other control parameters received from the stage controller 910N.

In the example of FIG. 13A, the stage controller 910N includes a memory interface circuit 1310 for reading or writing pixel data, tag data, or other information to or from the memory 906. The memory interface circuit 1310 is coupled by a bus to a controller circuit 1312. The controller circuit 1312 is coupled to an instruction memory 1314 and a local data memory 1316 (such as a dual port RAM), each of which are coupled to an interface 1318 to the processor 912. In one example, instructions for operating the stage controller 910N are downloaded into the instruction memory 1314 from the processor 912 through the processor interface 1318. In an example, the stage controller 910N is in communication with other stage controllers and/or the processor 912 to share, for example, addresses for image data, such as image blocks and frame data, line sizes, and/or color planes. An interface (not shown in FIG. 13A) links the stage controller with other stage controllers and/or the processor 912.

FIG. 13B is a block diagram of one example of a stage controller 910N or controller circuit 1312. The controller circuit 1312 includes a local bus 1330 that is completely within the controller circuit. The bus 1330 provides communication between the arithmetic logic unit 1332, registers 1334, local memory 1336, processing stage interface 1338, and an instruction decode circuit 1340. The arithmetic logic unit (ALU) 1332 is adapted to provide shift operation and add operation to data that typically comes from the registers 1334. Registers 1334 store data used frequently by the ALU 1332 and output by the ALU. The local memory 1336 is a cache type memory that stores data on not used as often as the registers. The interface 1338 communicates with the interface to stage controller 1308 (FIG. 13A). Interface 1338 provides a communication link and protocol so that the controller circuit can send and receive data with the processing stage. Instruction decode 1340 connects to an instruction fetch block 1342. Instruction fetch block 1342 is linked to a bus to provide access to instructions to be executed by the registers and ALU or sent to the processing stage through the interface 1338. Instruction fetch block 1342 includes a program counter to count the instruction memory address that is currently being read. That is, once an instruction arrives at the instruction fetch block 1342, the program counter increments by one. Instruction fetch block 1342 includes a branch detection that determines whether the instruction is a jump, branch or other change in incremental instruction, and if it is, the branch detection resets the program counter.

Figure 14:
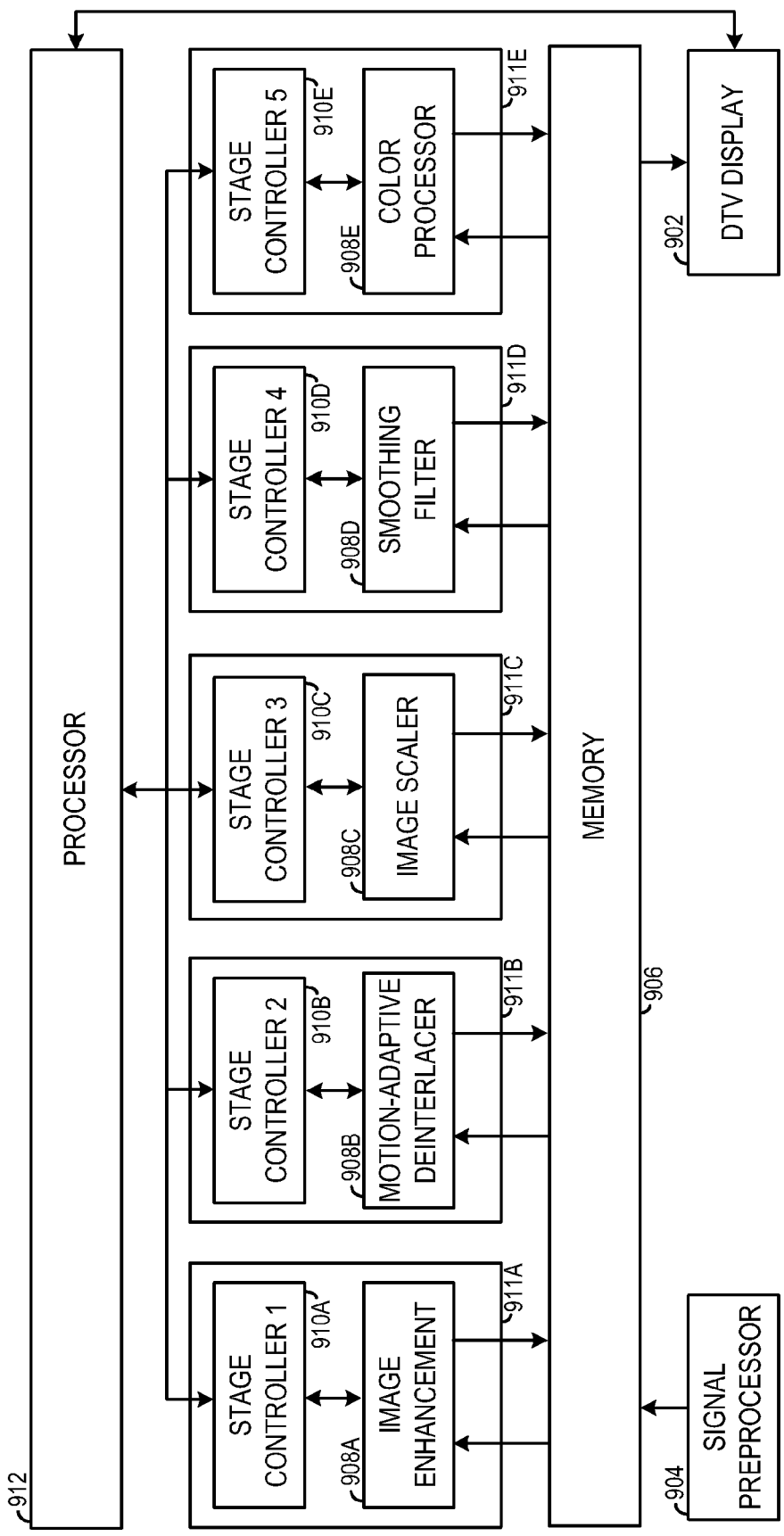
FIG. 14 is a block diagram, similar to FIG. 9, but illustrating a specific example of a processing pipeline that includes analysis/processing pipeline segments.

FIG. 14 is a block diagram, similar to FIG. 9, but illustrating a specific example of a processing pipeline that includes analysis/processing pipeline segments 911A-E. In the example of FIG. 14, the input signal is received by the signal preprocessor 904. The signal preprocessor 904 is coupled by a bus to the memory 906 so that the resulting analyzed or processed pixel data, tag data, and audio data are stored in the memory 906. The various pipeline segments 911A-E include image processing stages 908A-E that receive pixel data or tag data from the memory 906, perform their particular image processing thereupon, and return resulting pixel data or tag data to the memory 906.

Tag data may be used as an input to control or otherwise affect image analysis or processing by a particular image processing stage 908. In one example, input tag data is used to control a processing time used by the particular image processing stage 908, as discussed below. Tag data may also be provided as an output of the particular image processing stage 908, such as for use by other image processing stages 908 in the pipeline. In one example, output tag data from a particular image processing stage 908 is used to affect a processing time of such other image processing stages 908 in the pipeline, as discussed below.

In this example, the image processing stage 908A includes an image enhancement stage that performs noise filtering or other image enhancement on the pixel data. Examples of image enhancement include, among other things, aperture correction, coring (e.g., to remove a low amplitude high frequency signal component that is deemed noise), median filtering (e.g., of a specified number of input samples), or amplitude suppression.

The image processing stage 908B, in this example, includes a motion-adaptive de-interlacer to perform interlace-to-progressive digital signal reconstruction. An input interlaced digital video signal typically represents a frame of pixels separated into two separate fields of alternating horizontal scan lines. While this potentially increases spatial resolution, it can result in motion artifacts (e.g., "mouse's teeth," or "field tearing") for those pixels representing moving objects. A motion-adaptive de-interlacer 908B can be used to determine which pixels are static and which pixels are moving, and processing moving pixels differently from static pixels. In one example, moving pixels are processed using intrafield averaging or other filtering to avoid spatial artifacts, and static pixels are processed using interfield averaging or other filtering to avoid resolution loss. In another example, such different techniques a blended, such as by using a degree of detected motion. Pixel motion can be detected between frames, or between fields of a frame. Pixel motion can be determined on a pixel-by-pixel basis, or by aggregating pixels into contiguous or other groups for determining motion, so that de-interlacing can be performed accordingly.

In one example, the motion-adaptive de-interlacer 908B includes a cadence detector, such as to determine the film mode frame rate (e.g., number of frames per second (fps)) and sequence mapping of interlaced fields onto frames (e.g., 2-3 pulldown, 2-2 pulldown, 3-2 pulldown etc.). For example, in 2-3 pulldown, using four sequential frames (Frame A, Frame B, Frame C, and Frame D), Frame A is interlaced as Field 1 followed by Field 2, Frame B is interlaced as Field 1 followed by Field 2 followed by a repeat of Field 1, Frame C is interlaced as Field 2 followed by Field 1, and Frame D is interlaced as Field 2 followed by Field 1, followed by a repeat of Field 2. Cadence detection allows the de-interlacer to perform appropriate de-interlacing for the particular cadence. In one example, motion estimation is used to detect the cadence. For example, if a particular cadence is assumed, but yields an abnormally large amount of motion between frames, then one or more other cadences may be assumed to determine whether they yield a lower cost function for the motion estimate. In one example, the cadence corresponding to the lowest cost function for the motion estimate is assumed to be correct. Ongoing (e.g., periodic or occasional) cadence detection can be performed to detect any change in cadence. In certain examples, the cadence detection generates tag data, which, in turn, may be used to modify the processing time used by one or more of the image processing stages 108.

The image processing stage 908C, in this example, includes an image scaler, such as to resize the video frame from the pixel resolution of the input video signal to the pixel resolution of the DTV display 902. Other examples of image scaling techniques include nearest neighbor zero order, bicubic interpolation, each of which can be programmed into stage 908C. Where the pixel resolution of the DTV display 902 exceeds that of the input video signal, for example, interpolation or other upconversion of the input pixel data can be used to create the additional output pixel data, such as discussed above.

The image processing stage 908D, in this example, includes a smoothing filter, such as to refine the scaled pixel data produced by the image scaler of the image processing stage 908C. In one example, the smoothing filter of the image processing stage 908D includes a finite impulse response (FIR) filter to smooth edges produced by the upconversion of other scaling by the image scaler of the image processing stage 108C. In one example, a the nature of the smoothing depends on input tag data, such as to adapt the filter coefficients, number of taps in the FIR filter, etc. In various examples the input tag data includes information about one or more of an edge angle, an extracted feature from the image, or horizontal or vertical phase information.

The image processing stage 908E, in this example, includes a color processor, such as to adjust brightness, hue, saturation, etc. of the pixel data. In one example, the color processor uses tag data to control such adjustment. Other examples of color processing at 908E include brightness leveling, color balance, color temperature adjustment, contrast adjustment, or contrast range expansion.

In prior image processing systems having multiple image processing operations, the different processing operations are often designed independently by different manufacturers. A given processing block typically is designed to perform in a variety of different settings, and to be highly interoperable and compatible with components and architectures of varying configurations and different manufacturers. Accordingly, a given type of processing block typically is designed to be relatively self-sufficient and self-contained. One reason for this is that it normally is not known beforehand what other components might be present in the overall system in which it is to be used.

Accordingly, in prior systems, certain types of functionality are typically built into or incorporated within each of the different image processing operations. Motion estimation, for example, is a base-level function that must be performed for various different processing operations, since motion greatly affects image processing. Thus, in a prior system having deinterlacing, scaling and color processing operations, there may be three separate motion estimation blocks, one being associated with each of the three different image processing operations.

Such replication of functionality will at times be undesirable. For example, multiple motion estimation blocks can provide an inconsistent view of motion occurring within the video data, as it is likely that each block will employ a different motion assessment methodology. The redundant functionality also will result in larger circuits and greater use of silicon, which in turn can lead to higher manufacturing costs. A variety of other inefficiencies may result from such redundant functionality. For example, in a deinterlacing circuit with an associated built-in motion estimator, motion estimation calls might be performed during every deinterlacing operation, regardless of whether the motion information is needed.

Accordingly, the present inventors have recognized that in many cases it will be desirable to configure the image processing system with an architecture that enables enhanced interaction between and sharing of data among system components, and in particular, between and among image processing operations. An embodiment of an image processing system having such an enhanced architecture is shown generally in FIG. 14. As indicated, the system includes multiple image processing segments 911A-911E, each adapted to perform processing operations. Included among image processing segments 911A-911E may be a deinterlacer, an image interpolator, a color processor, an image enhancer/booster, and/or various other image processing blocks/operations. Image processors 911A-911E are configured to process input pixels, so as to enable the system to output pixels. In an example, a motion estimator as part of any one of the segments employs a variety of different methodologies or routines to analyze pixels over time and thereby assess the motion present in different parts of the video signal. Any generated motion estimation data may be saved as tag data to be fed forward or backward to other processing segments to dynamically control processing in the processing segments.

Figure 15:
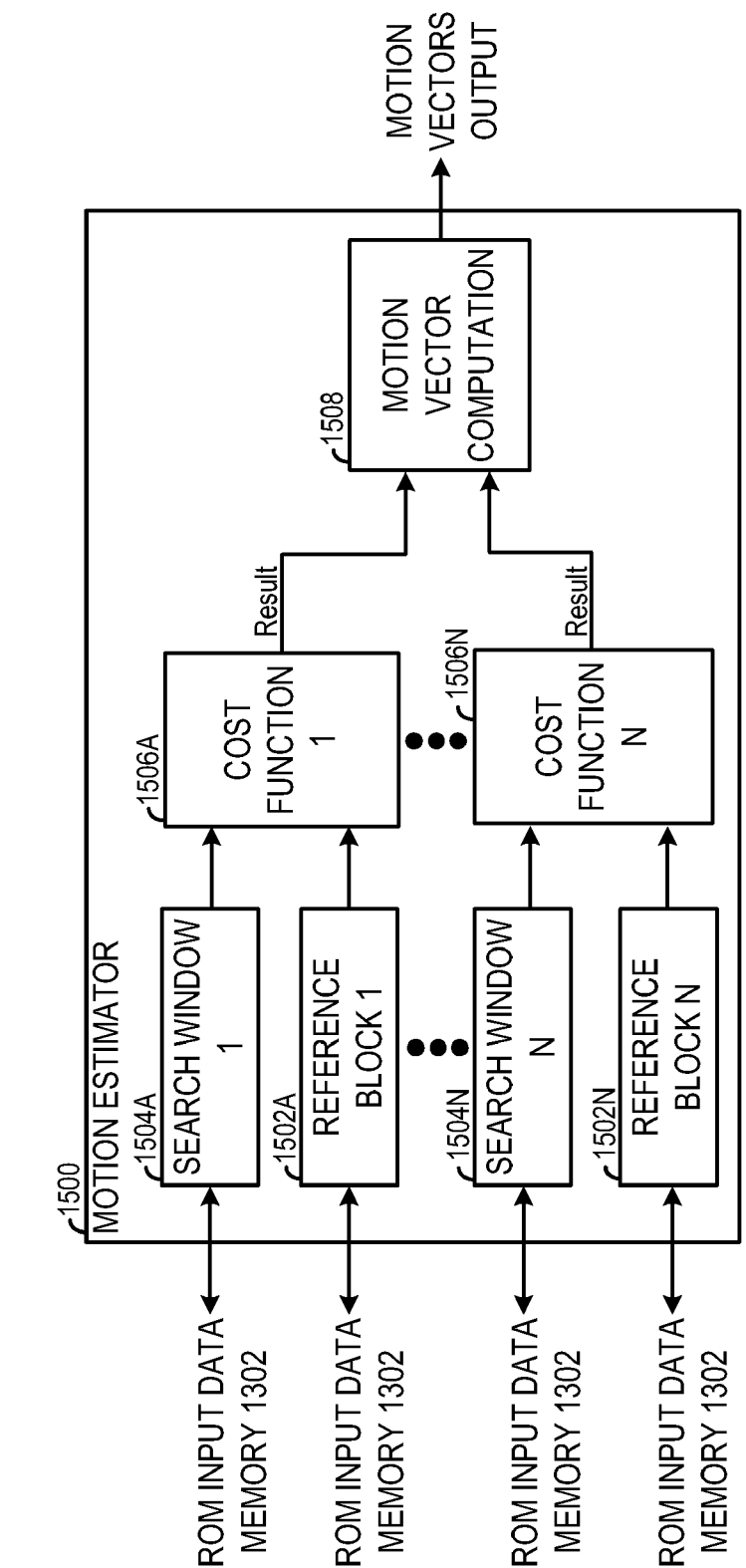
FIG. 15 is a block diagram illustrating generally one example of a motion estimator of a motion-adaptive de-interlacer.

FIG. 15 is a block diagram illustrating generally one example of a motion estimator 1500 circuit of a motion-adaptive de-interlacer as shown as being included in the image-processing stage 908B of FIG. 14. In this example, the motion estimator 1500 receives pixel data from the memory 906, such as via a memory interface circuit 1300 and input data memory 1302 of FIG. 13. Although, motion estimation could be performed on a pixel-by-pixel basis for each pixel in the pixel data, the pixel data will more typically be divided into various reference block 1500A-N upon which motion estimation between temporally different (e.g., adjacent) frames is to be performed. The reference blocks 1502A-N typically all correspond to the same first image frame. Each reference block 1502A-N corresponds to a search window block 1504A-N. The search windows 1504A-N typically all correspond to the same second image frame—which is different from the first image frame. The second image frame is typically the temporally next image frame that follows after the first image frame in the video succession of image frames.

The search windows 1504A-N are typically bigger than the corresponding reference blocks 1502A-N. Each reference block 1504A-N is positioned at various locations within its corresponding search window 1504A-N. A cost function module 1506A-N computes a "cost function" to determine how well the reference block 1502A-N correlates to its corresponding position in the search window 1504A-N. The lowest cost function is deemed to represent the new position in the second frame of the reference block pixels from the first frame. Based on this new position in the second frame, and the reference block's original position in the first frame, a motion vector (e.g., direction and magnitude) can be computed for each reference block 1502A-N by a motion vector computation module 1508.

In one example, a successive approximation approach is used for each reference block 1502A-N. To illustrate, suppose that the reference block is sized as 8 pixels by 8 pixels. In this illustrative example, during an initial pass, a 128 pixel by 64 pixel search window is used. During a second pass, a 9 pixel by 9 pixel search window is applied to the lowest cost function produced by the first pass, in order to refine the motion vector computation. In this example, the two-pass approach yields ¼ pixel resolution in the computed motion vectors.

In one example, the resulting motion vectors are output to the interface 1308, and communicated to the controller circuit 1312 of the stage controller 910, which, in turn, communicates the resulting motion vectors to the memory 906 via the memory interface circuit 1310. In another example, the resulting motion vectors are output to an output data memory 1306, a memory interface circuit 1300, and then to the memory 906. Although FIG. 15 illustrates an example of N parallel cost function blocks corresponding to the N reference blocks 1502A-N, a serial or serial/parallel combination architecture is also possible. In one example, the input data from memory 1302 includes not only pixel data, but also includes motion vectors computed between the first frame and a previous frame, such as for use to determine an initial position of the reference block 1502 within corresponding the search window 1504 for computing the new motion vectors between the first and second temporally adjacent frames. In another example, the received motion vectors from a previous frame are also used to allocate a processing time for performing motion estimation on a present frame (e.g., more motion or more complex motion in a previous frame results in allocating additional time for performing motion estimation in a present frame).

Figure 16:
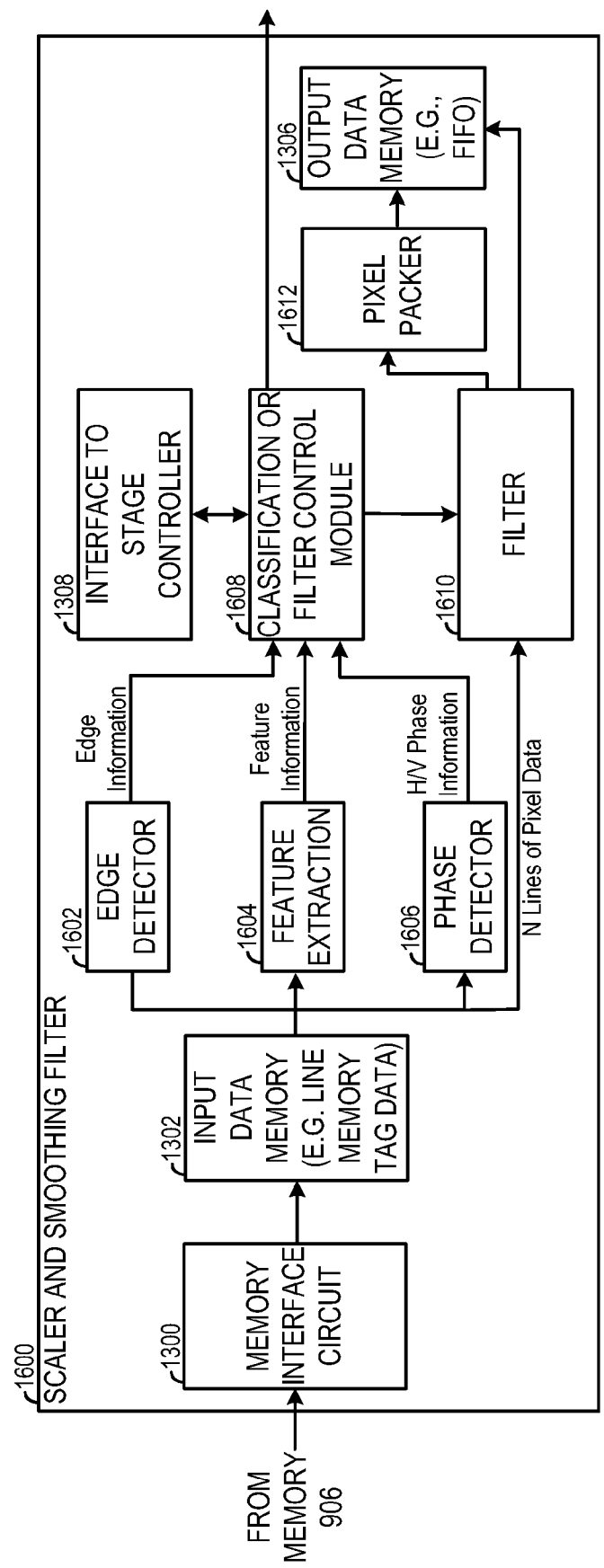
FIG. 16 is a block diagram illustrating generally an example in which portions of pipeline segments are combined, such as by combining one or more portions of an image scaler with one or more portions of a smoothing filter.

FIG. 16 is a block diagram illustrating generally an example in which portions of pipeline segments 911 are combined. In the example of FIG. 16, portions of the image scaler of the pipeline segment 911C are combined with portions of the smoothing filter of the pipeline segment 911D, as illustrated by the scaler and smoothing filter 1600 of FIG. 16. The scaler and smoothing filter 1600 includes a memory interface circuit 1300 for receiving pixel data or tag data from the memory 906. Such pixel data or tag data is communicated to the input data memory 1302, which, in this example, includes a line memory for storing N lines of pixel data, as well as additional memory for storing tag data received from the memory 906.

In the example of FIG. 16, the scaler and smoothing filter 1600 includes one or more of an edge detector 1602 circuit, a feature extractor 1604 circuit, and a phase detector 1606 circuit. In one example, the edge detector 1602 receives the pixel data or tag data from the input data memory 1302. The edge detector 1602 detects edges in the received pixel data, or from the tag data (e.g., if edge detection has already been performed by a different image analysis or processing stage). The edge detector 1602 processes the pixel data or tag data to provide edge angle or other edge information to a classification or filter control module 1608.

In FIG. 16, the feature extractor 1604 receives the pixel data or tag data from the input data memory 1302. The feature extractor 1604 extracts viewable features, such as by processing the pixel data, or from the tag data (e.g., if the feature extraction has already been performed by a different image analysis or processing stage). In one example, the feature extractor 1604 provides a resulting feature map or other feature information to the classification or filter control module 1608. Other examples of feature information optionally include motion information, contrast information, edge information, spatial frequency information, average or minimum or maximum or other color level information (e.g., to permit scaling darker images differently than lighter images, to permit limiting output color values to avoid extending beyond input color values, etc.).

In FIG. 16, the phase detector 1606 detects horizontal or vertical phase information from the pixel data or tag data received from the input data memory 1302. The phase detector 1606 provides resulting horizontal or vertical phase information to the classification or filter control module 1608.

The classification or filter control module 1608 is coupled to the interface 1308 for communicating with the controller circuit 1312 of the corresponding stage controller 910. In one example, the corresponding stage controller 910 provides the classification or filter control module 1608 with information for implementing a dynamic classification algorithm to use one or more of the edge information, the feature information, or the horizontal or vertical phase information to generate a classification or other control parameter to provide to a filter 1610 circuit. In one example, the filter 1610 is an finite impulse response (FIR) smoothing or interpolation filter. For example, if the image is being scaled in a direction x, then a filtered pixel value is typically computed for a particular pixel by multiplying that pixel value and that of a number of other pixels along the x direction by an individualized filter coefficient, and then summing these products. Similarly, if the image is being scaled in a direction y, then a filtered pixel value is computed for a particular pixel by multiplying that pixel value and that of a number of other pixels along the y direction by an individualized filter coefficient, and then summing these products. The filtering in these two different directions can be done sequentially or can be combined into a single operation.

In one example, the filter coefficients, number of FIR filter taps, filtering methodology, etc., are tailored using the classification or other control parameter information received from the classification or filter control module 1608. As an illustrative example, detecting an edge may trigger a spatial rotation of the filter coefficients, such as to align to the edge (e.g., to enhance the edge), or to align orthogonal to an edge (e.g., a low-angle edge) to crop or smooth the edge. In an example, the horizontal or vertical phase information is used to determine the phase of the filter, such as for weighting the filter coefficients according to the horizontal or vertical phase information. In another example, the filter is tailored using temporal motion information. In an illustrative example, where enough motion is detected, a softer lowpass filter is used, but where a relatively static video image is detected, a midrange or highpass filter is used to preserve more spatial detail in the static image. The tailoring of the filter 1610 may, in turn, affect its processing time, which, in turn, may affect the processing time available to other image analysis or processing stages. In one example, such processing time variations are tracked and processing time is allocated or controlled using a time bank, as discussed below.

In FIG. 16, the smoothed pixels output by the filter 1610 are provided to a pixel packer 1612. In this example, the pixel packer 1612 compiles the pixels into data words that are then provided to and stored in the output data memory 1306. In the example of FIG. 16, the output data memory 1306 includes a first-in-first-out (FIFO) portion that stores the pixel data in data words to be communicated (e.g., via a memory interface circuit 1300) to the memory 906. In one example, the output data memory 1306 also provides storage for tag data generated by the filter 1610, the classification or filter control module 1608, the edge detector 1602, the feature extractor 1604, or the phase detector 1606. Such tag data is similarly communicated (e.g., via a memory interface circuit 1300) to the memory 906.

EXAMPLE 3

Figure 17:
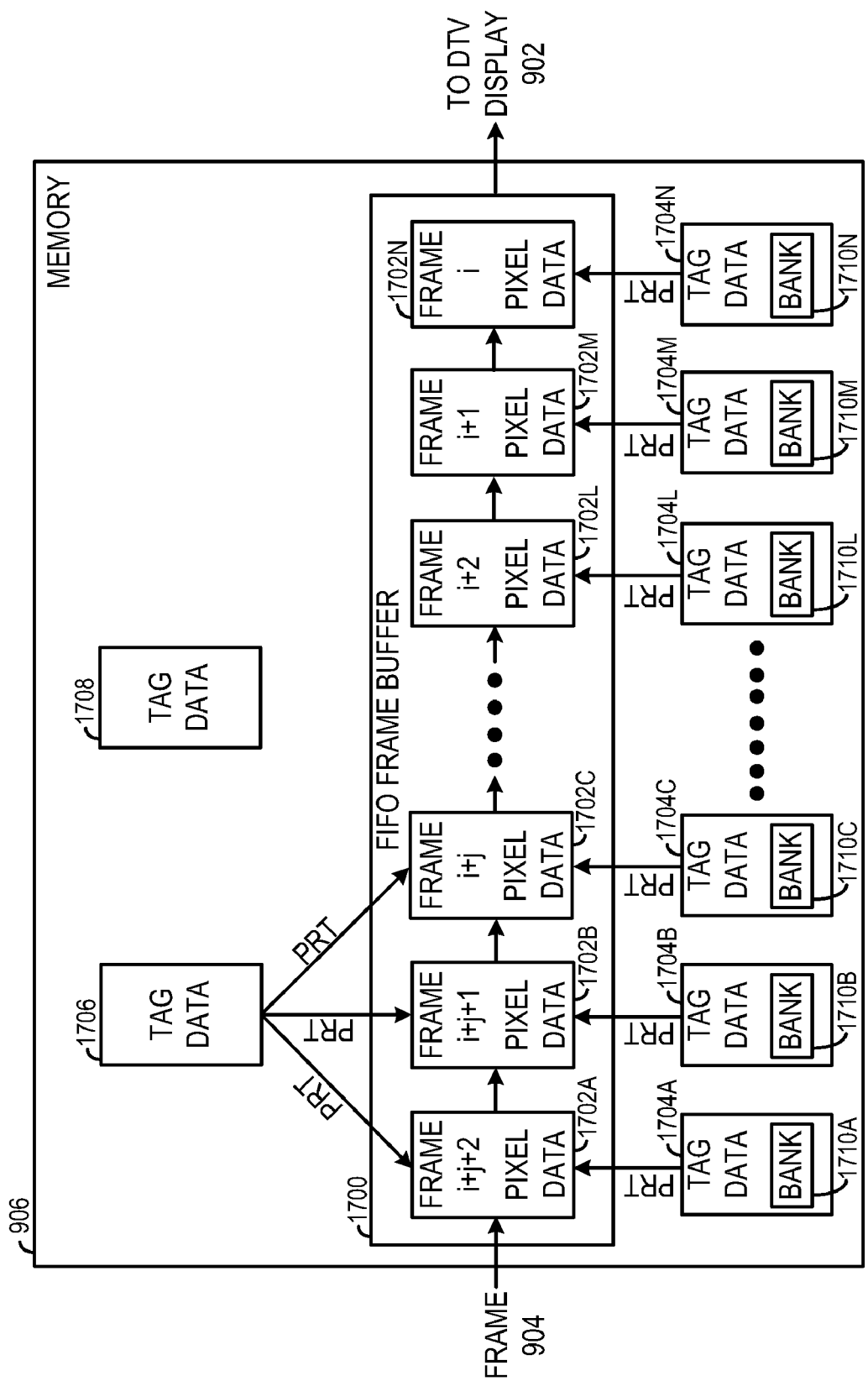
FIG. 17 is a block diagram illustrating generally one example of portions of a memory.

FIG. 17 is a block diagram illustrating generally one example of portions of the memory 906 in more detail. In this example, the memory 906 includes a first-in-first-out frame buffer 1700 that receives a programmable number of frames 1702A-N of pixel data from the signal preprocessor 904. During the time when the pixel data frames 1702A-N are stored in the frame buffer, they are accessed and processed by the image analysis or processing stages 908, which typically results in the pixel data being altered (perhaps multiple times) before it is output by the frame buffer 1700 to the DTV display 902. In an illustrative example, the frame buffer 1700 includes about 30 to 40 frames of pixel data, which is stored in about 128 Mbytes of dynamic random access memory (DRAM). However, in another example, the frame buffer 1700 can be programmed to store a different number of frames of pixel data, or to use a different amount or type of memory.

FIG. 17 also illustrates tag data being stored in the memory 906. In this conceptualization, such tag data includes tag data 1704A-N corresponding to respective frames (e.g., by a pointer from the particular tag data 1704A-N to the particular frame 1702A-N with which it is associated, or vice-versa). Such tag data may also include other tag data 1706 that is associated with multiple pixel data frames 1702A-N. Such tag data may also include other tag data 1708 that is not associated with any particular pixel data frames 1702. For example, such other tag data 1708 may be associated with particular image analysis or processing stages 908, or with the signal being received by the signal preprocessor 904, or the like.

In the example of FIG. 17, each tag data 1704A-N includes a corresponding time bank 1710A-N to track or allocate time for processing a corresponding pixel data frame 1702A-N, such as by one or more of the image analysis or processing stages 908. Each time bank 1710 can be conceptualized as illustrated in FIG. 18. Moreover, in an example, the memory 906 includes a frame buffer donated time bank 1720 to track remaining time that is donated by one or more image analysis or processing stages or frames, such as for use by "borrowing" subsequent image analysis or processing stages or subsequent frames in the frame buffer that are being analyzed or processed by such image-processing stages or frames.

FIG. 18 depicts an example of one conceptualization of a time bank. In the conceptual example of FIG. 18, each frame's time bank 1710 includes a frame processing time indicator 1800 and a corresponding frame borrow time indicator 1801. This conceptualization also includes, for each image analysis or processing stage 908A-N, a corresponding stage processing time indicator 1802A-N and a stage borrow time indicator 1803A-N. In the example of FIG. 18, the frame processing time indicator 1800 tracks how much time is available for performing processing of a particular image frame 1702. In one example, the frame processing time indicator 1800 is initialized, upon storing a frame 1702 in the frame buffer 1700, to a time value that is approximately equal to the amount of time that the particular image frame 1702 is expected to be stored in the frame buffer 1700 before being output for display. In this conceptualization, the frame processing time indicator 1800 then immediately begins clocking downward toward zero.

FIG. 18 also depicts stage processing time indicators 1802A-N, which are not required, but which help understand that each image analysis or processing stage 908 can be allocated a specified stage processing time within which it is to perform its analysis or processing. If such processing by a particular stage is not completed within its allocated time, then, in one example, that stage's processing can be prematurely suspended or terminated upon expiry of its allocated stage processing time, and the stage's corresponding borrow time indicator 1803 is set. This permits the returning to complete such processing by that stage if, after at least some processing is performed by other designated stages in the processing pipeline, some of the available frame processing time remains, or if frame processing time can be borrowed from other frames.

In another example, if such processing by a particular stage 908 is not completed within its allocated time, then that stage's processing need not be automatically prematurely suspended or terminated upon expiry of its allocated stage processing time. Instead, the stage 908 looks ahead to see if any other stages 908 operating on the same frame, or other frames, have donated spare time. If so, such processing time is "borrowed" and the stage 908 continues its processing beyond its allocated stage processing time. If not, then that stage's processing is prematurely suspended or terminated.

Figure 19A:
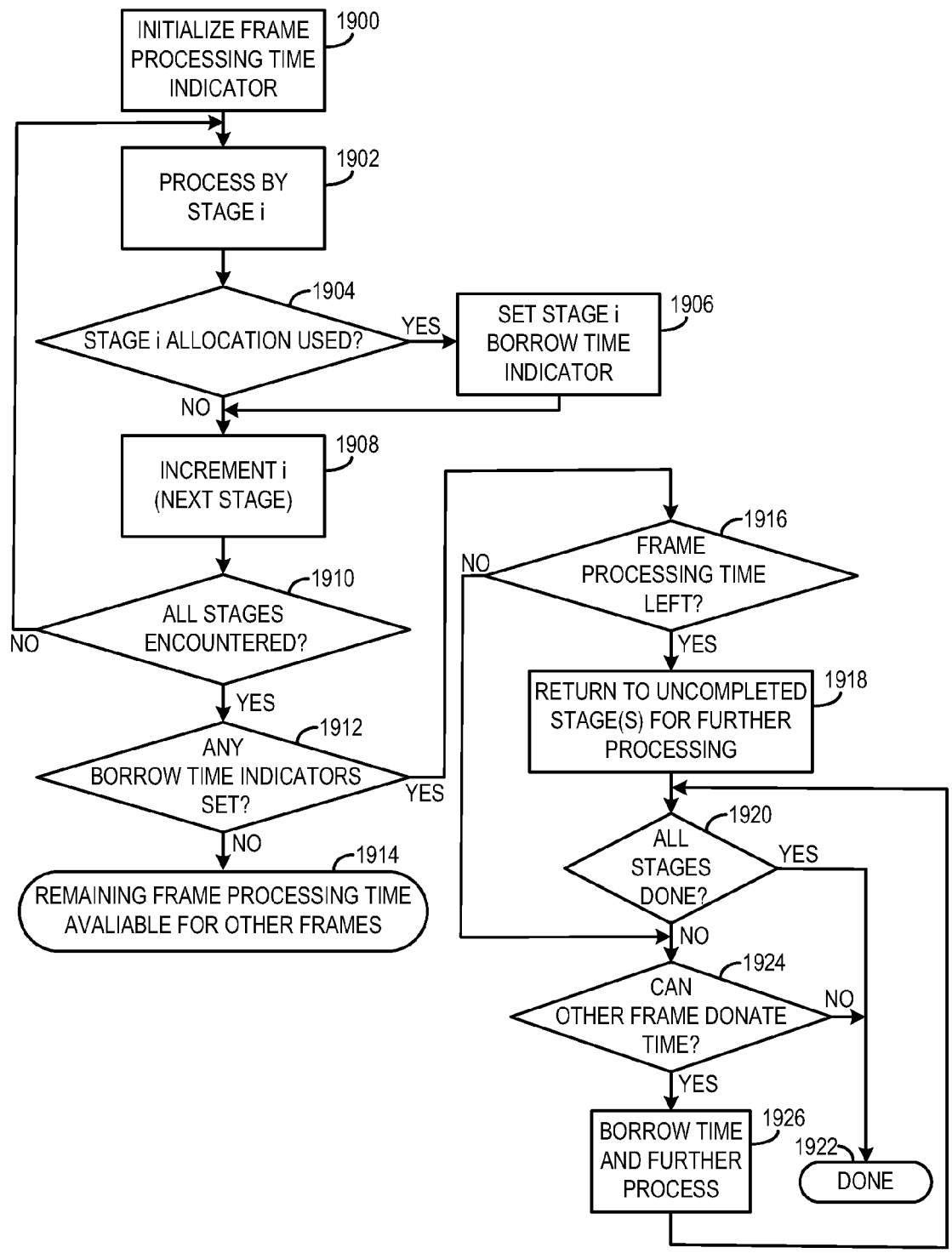
FIG. 19A is a flow chart illustrating generally one example of using a time bank to share an allocated frame processing time, such as between different image analysis or processing stages or even between different image frames.

FIG. 19A is a flow chart illustrating generally one example of using a time bank to share an allocated frame processing time, such as between different image analysis or processing stages 908A-N, or even between different frames 1702 of pixel data. In this example, at 1900, when a particular frame 1702 is input into the frame buffer 1700, its corresponding frame processing time indicator 1800 is initialized to an allocated available processing time value. In one example, the available frame processing time value is set to approximately the expected time during which the particular frame 1702 will be stored in the frame buffer 1700 before that particular frame 1702 is to be output from the frame buffer 1700 to the DTV display 902 for display. In one example, the available frame processing time indicator immediately then begins real-time clocking downward toward zero as that frame continues to be stored in the frame buffer 1700. At 1900, a stage counter i is also initialized, such as to i=1 for processing by a first of N image analysis or processing stages 908. At 1900, the borrow time indicators 1801 and 1803 are also initialized to zero (i.e., "no").

At 1902, processing of that particular frame by pipeline stage i occurs. At 1904, it is determined whether an allocated time for stage i has expired (without completing the processing by that stage). If so, the borrow time indicator 1803 for that stage i is set at 1906. Otherwise, process flow continues to 1908, where i is incremented, i.e., processing proceeds to 1902 for processing by the next stage 908 in the pipeline, unless at 1910 all (or a specified subset) of the stages have been encountered. If, at 1910, all such stages 908 have been encountered (i.e., they have had at least one opportunity to perform some processing on that particular frame of data), then process flow proceeds to 1912. At 1912, it is determined whether any stage borrow time indicator 1803 has been set, indicating that at least one of the stages did not complete its processing in the time that was allocated to it. (In one example, this is simplified by setting the frame borrow time indicator 1801 if any of the stage borrow time indicators 1803 have been set. In another example, however, the frame borrow time indicator is only set if the frame needs to borrow time from another frame).

At 1912, if no borrow time indicators were set (indicating that all stages completed their processing within their allocated processing time), then any remaining frame processing time is made available (i.e., "donated") at 1914 for use by any other frames needing further processing before such remaining frame processing time runs out.

At 1912, if at least one borrow time indicator 1803 was set, then process flow proceeds to 1916, where it is determined whether the same frame has any remaining frame processing time. If, at 1916, the same frame still has remaining processing time, then process flow proceeds to 1918. At 1918, processing returns to any uncompleted stage(s) 908 for further processing until the frame processing time 1800 runs out. If, at 1920, all stages complete their processing before the frame processing time runs out, then process flow proceeds to 1922, and any remaining frame processing time is made available (i.e., "donated") at 1914 for use by any other frames needing further processing before such remaining frame processing time times out.

If, at 1920, all stages have not completed their processing and the frame processing time has run out (or if, at 1916, at least one borrow time indicator 1803 was set and no frame processing time was left), then process flow proceeds to 1924 to determine whether any other frames can donate any of their remaining frame processing time for further processing of the instant frame. This will typically involve borrowing time at 1926 (if available) from any frames for which all processing has already been completed, and which are to be displayed sooner than the instant frame. However, it could also involve borrowing time from other frames that are to be displayed later than the instant frame. In either case, any such additional processing at 1926 must be completed before the instant frame is to be displayed. If at 1924, no time is available to be borrowed, process flow continues to 1922, and the frame proceeds through the frame buffer for display.

Figure 19B:
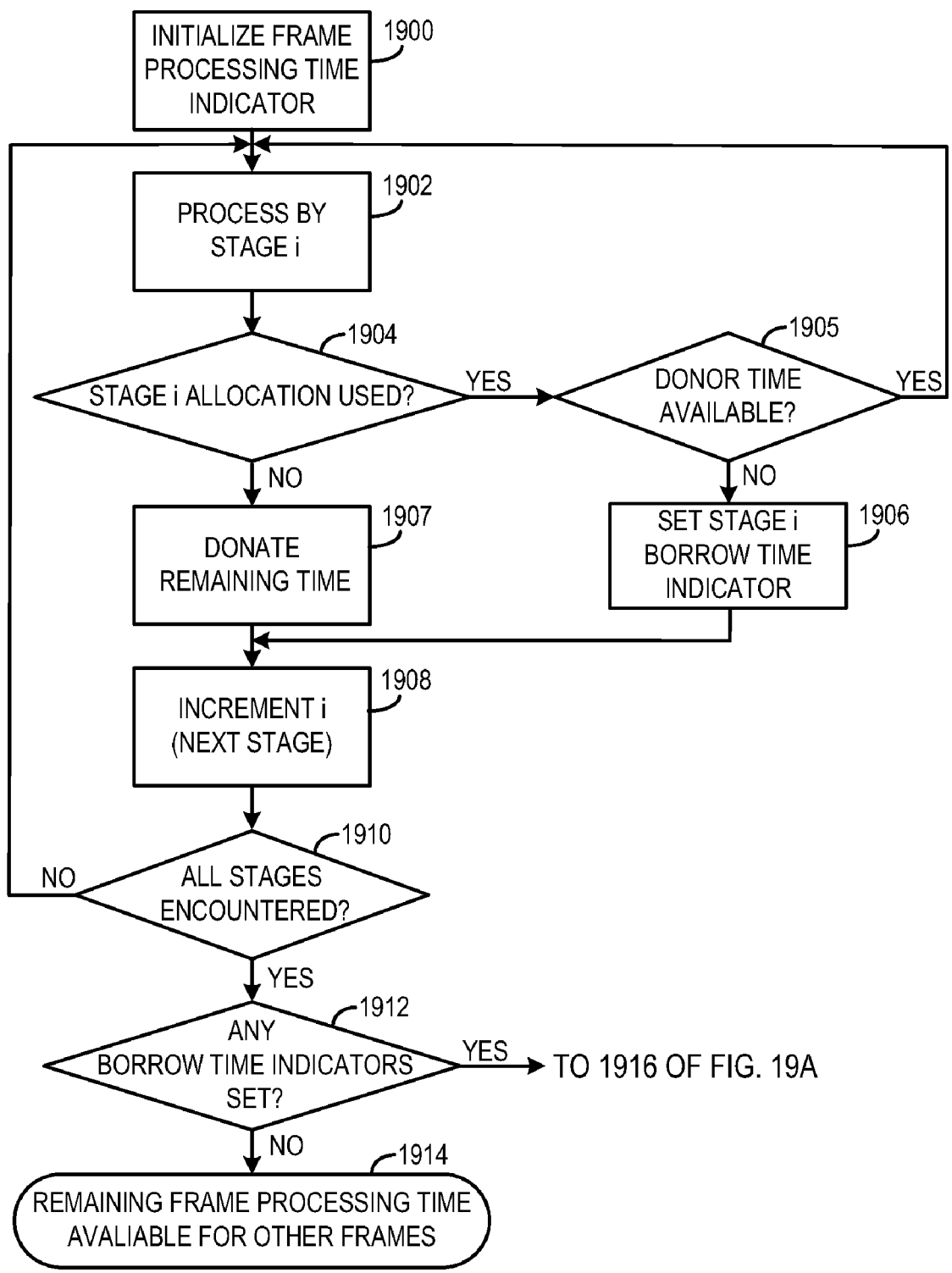
FIG. 19B illustrates a modification to the process described in FIG. 19A, where the modification permits borrowing time "on the fly."

FIG. 19B illustrates a modification to the process described in FIG. 19A, where the modification permits borrowing time "on the fly," such as where donated time is available, without interrupting processing by a particular stage and without requiring that all stages be encountered before a particular stage's processing time is allowed to exceed its allocated processing time. In the example of FIG. 19B, if at 1904, a stage's allocated time is used without completing processing by that stage 908, then at 1905 a check is made as to whether any donated time is available. In one example, this involves checking the frame buffer donated time bank 1720, which tracks such donated time that is still available for use by other stages or frames. If any such donated time is available, then it is added to the stage's allocated time, and process flow returns to 1902 for further processing by the same stage 908. Otherwise, if no such donated time is available, then process flow continues to 1906, where the process flow continues as described with respect to FIG. 19A.

In FIG. 19B, if processing by a stage completes at 1902 without having used up that stage's processing time allocation at 1904, then process flow continues to 1907, where any remaining time is donated for use by other stages or frames. In one example, this donated time is tracked by the frame buffer's donated time bank 1720. Process flow then continues at 1908, such as described with respect to FIG. 19A. As described with respect to FIG. 19A, at 1914, after processing of the frame is completed without any borrow time indicators being set, then any remaining time is donated for use by other frames. In one example, such donated time is tracked by the frame buffer's donated time bank 1720, as discussed above.

Figure 19C:
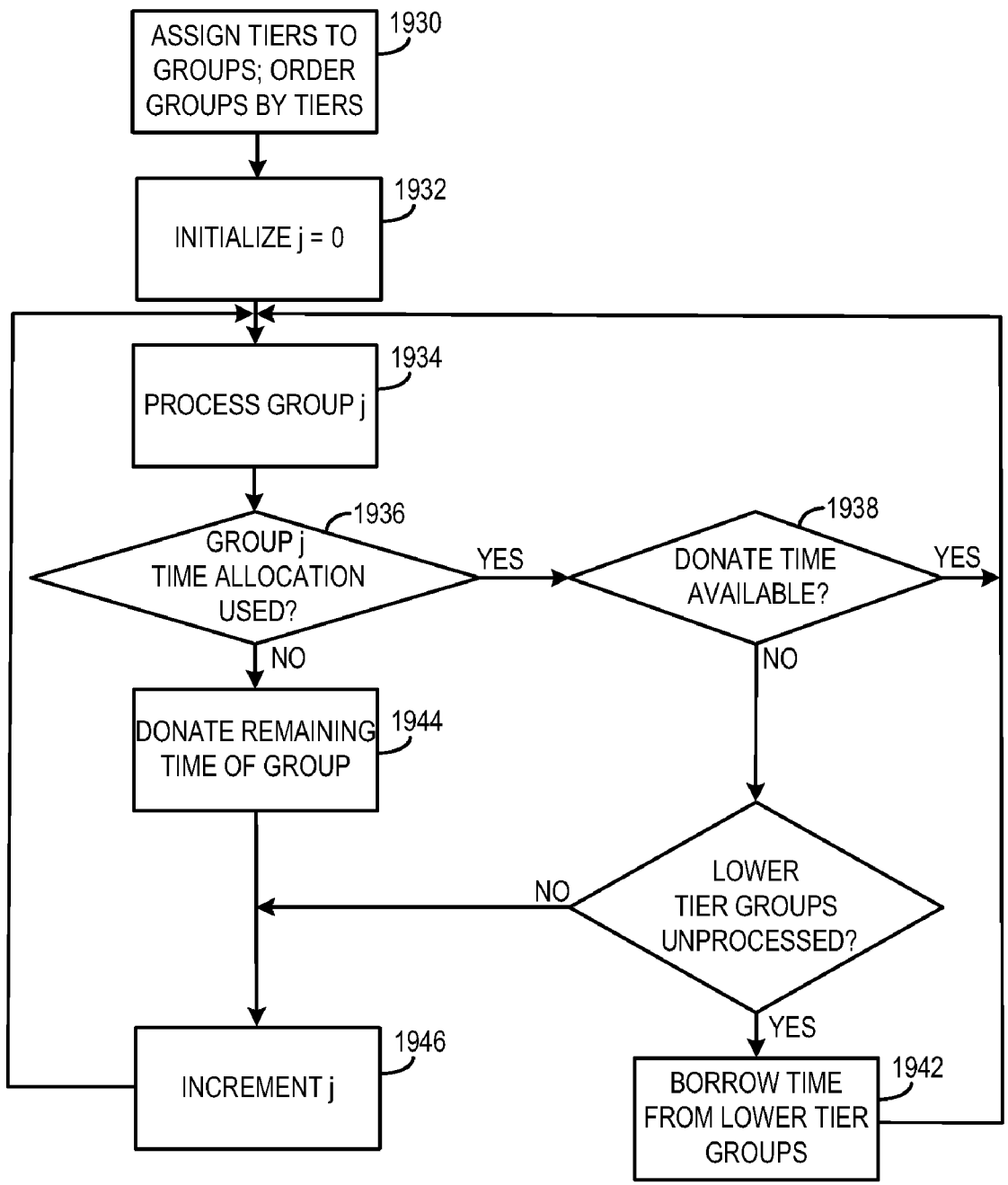
FIG. 19C is a flow chart that illustrates an example in which the processing optionally permits sharing of allocated time between different groups of pixels.

FIG. 19C is a flow chart that illustrates an example in which the processing by stage i at 1902 optionally permits sharing of allocated time between different groups j within the same video image frame. In the example of FIG. 19C, at 1930, groups within a frame are accorded different tiers indicative of the relative importance of processing that group. As an illustrative example, groups spatially located closer to the center of the image are designated "Tier 1," giving them a higher processing priority than other groups that are spatially located closer to the periphery of the image, which are designated "Tier 2." In other examples, the groups are assigned to more than two Tiers, indicating the relative importance of processing such groups. At 1930, the groups are ordered (e.g., using the index j) according to their tier assignments. For the illustrative two-tier example, Tier 1 groups are given lower values of the index j, and Tier 2 groups are given higher values of the index j. This permits the Tier 1 groups to be processed before the Tier 2 groups. Each group is also allocated a group processing time. In one example, the lower tier (e.g., Tier 1) groups are allocated a longer processing time than the higher tier (e.g., Tier 2) groups. At 1932, the index j is initialized to zero. At 1934, group j is processed by an image analysis or processing stage 908 until completion or until its allocated processing time has expired. At 1936, if the time allocation of group j is used up without completing processing of group j, then process flow proceeds to 1938, where it is determined whether there is any donated time available (e.g., from previously processed groups). If such donated time is available at 1938, then it is added to the time allocation of group j, and process flow returns to 1934 for further processing of group j until processing of group j is completed or the donated time is used up. At 1938, if no such donated time is available, then process flow proceeds to 1940, to determine whether there are any lower tier (e.g., lower processing priority) groups that remain unprocessed. If so, then at 1942 processing time is borrowed from such lower tier groups, and process flow returns to 1934 for further processing of group j until processing of group j is completed or the donated time is used up. In this example, if at 1936, the entire processing time allocation of group j is not used up, then process flow proceeds to 1944, where any remaining time is donated for use by other groups, after which the index j is incremented at 1946 and process flow returns to 1934 to process the next group. In this example, if at 1940 there are no unprocessed lower tier groups, then process flow proceeds to 1946 to increment the index j before proceeding to 1934 to process the next group. In this manner, group processing is performed according to FIG. 19C until all groups have been processed, however, some lower tier groups may not be processed, for example, if their processing time has been donated to higher tier groups such that no processing time remains for processing the lower tier groups. In one example, any remaining processing time is made available for processing of subsequent frames in the frame buffer.

Figure 20A:
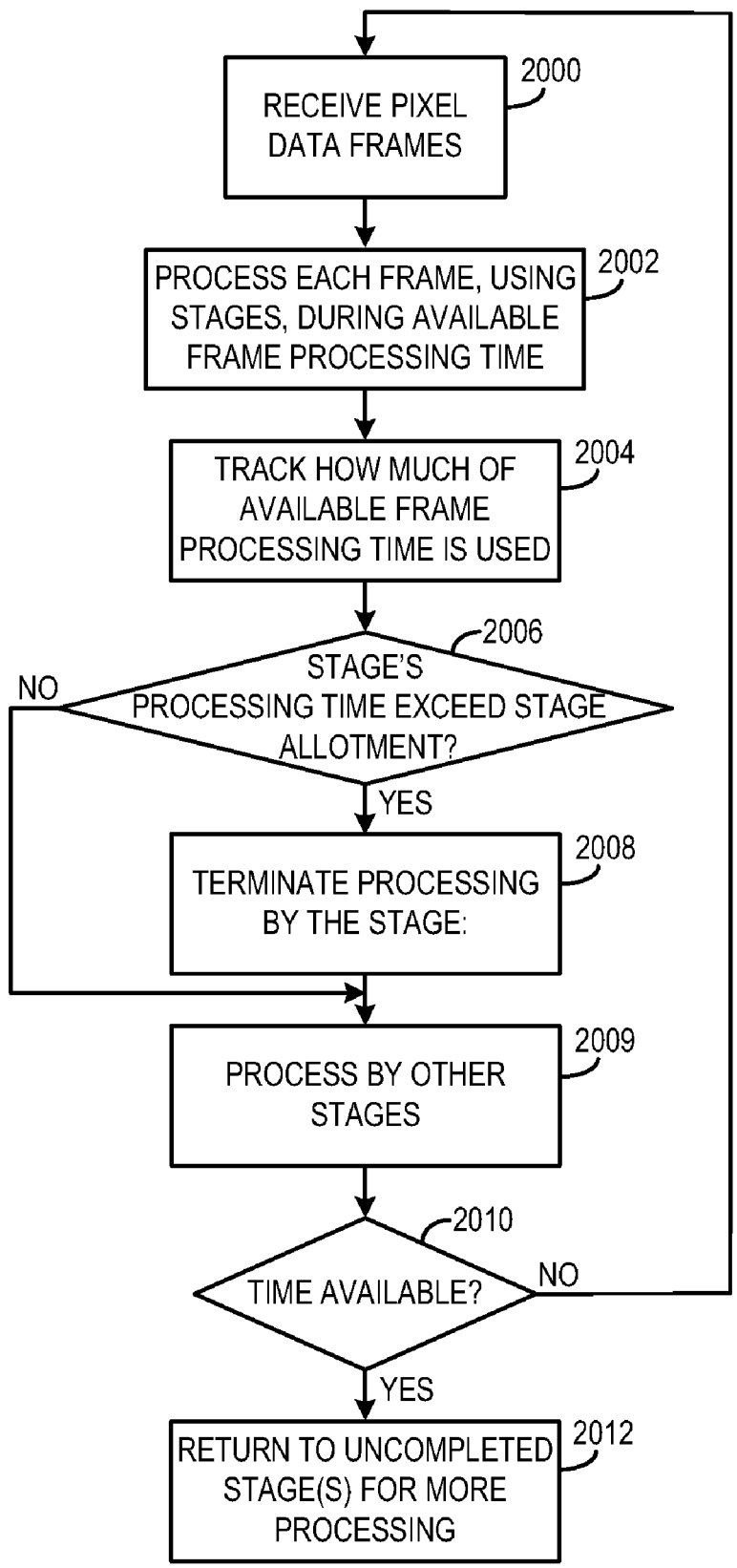
FIG. 20A is a flow chart illustrating generally another conceptual example of a processing time sharing method.

FIG. 20A is a flow chart illustrating generally another conceptual example of a processing time sharing method. In the example of FIG. 20A, at 2000, temporally different frames of video pixel data are received. At 2002, each frame is processed, using image processing stages, during an available frame processing time period. At 2004, a time bank or other technique is used to track how much of the available frame processing time period is used by each image processing stage. At 2006, if a frame processing time that is actually used by a particular image processing stage exceeds an allotted processing time for that particular image processing stage, then at 2008 processing of the frame by that particular image processing stage is terminated prematurely. At 2009, further processing is performed using the other image processing stages t-o at least partially perform their processing. Then, at 2010, if there is any remaining time left in a time bank (such as the frame processing time bank of the same or other frames), then process flow continues at 2012, which constitutes borrowing at least a portion of the remaining time for returning to the prematurely terminated processing and performing further processing, such as toward completion of the same.

Figure 20B:
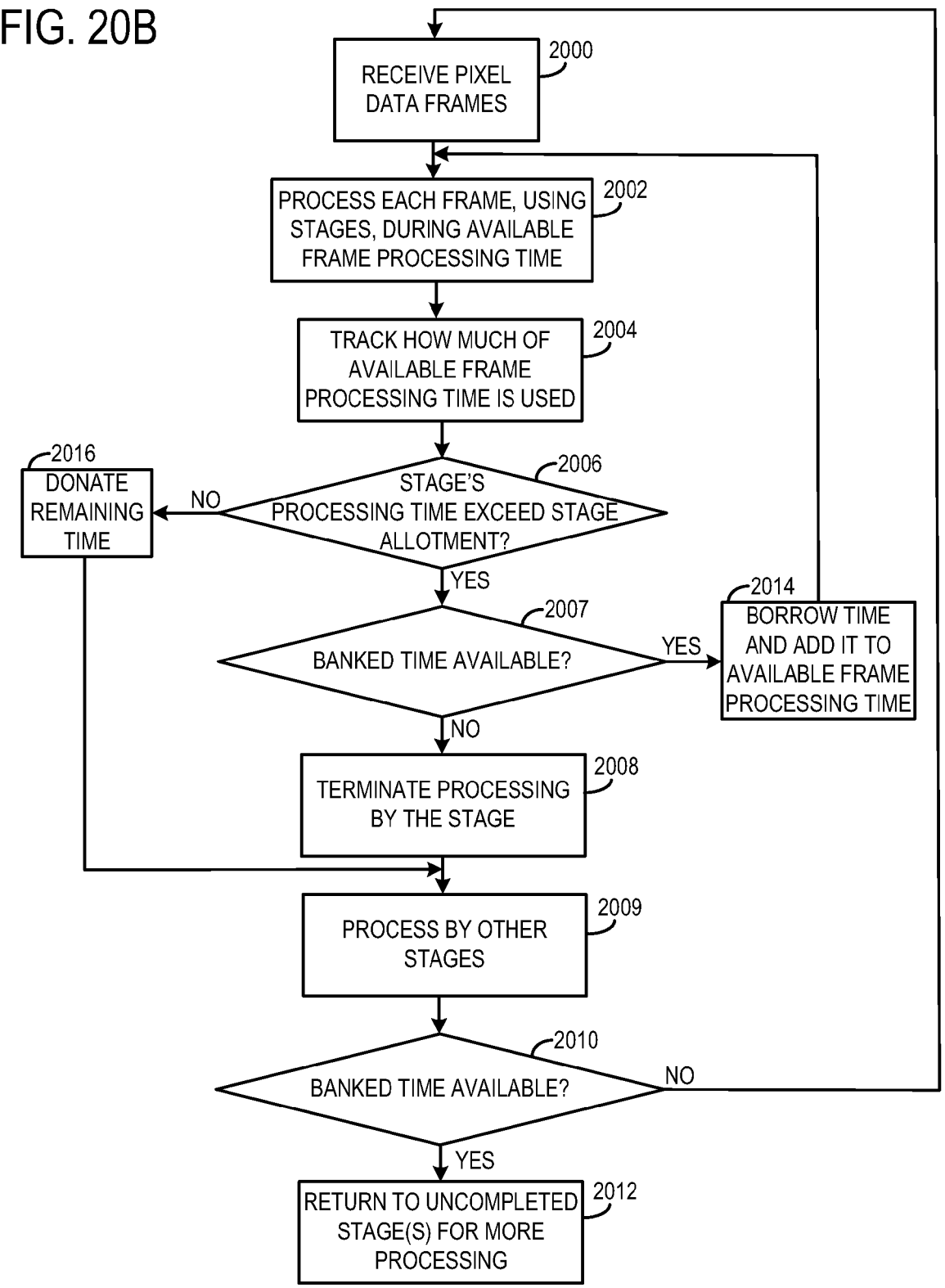
FIG. 20B is a flow chart illustrating a modification of the process shown in the flow chart of FIG. 20A.

FIG. 20B is a flow chart illustrating a modification of the process shown in the flow chart of FIG. 20A. In FIG. 20B, at 2006, if a stage's processing time exceeds the stage's processing time allotment without having completed the analysis or processing of that stage, then, at 2007, it is determined whether there is any banked time available (e.g., donated by earlier stages, earlier frames, or both). If such banked time is available at 2007, then process flow proceeds to 2014, and an amount of the banked time is borrowed and added to the available frame processing time, so that further processing can be performed by that stage by returning process flow to 2002. Otherwise, if, at 2007, no banked time is available, then at 2008, processing by that stage is terminated, and processing by other stages is performed at 2009. At 2006, if processing by a stage is completed without exceeding the stage's processing time allotment, then process flow continues to 2016 such that any remaining portion of the stage's allotment of processing time is donated to the banked time made available to later stages or frames.

Figure 21:
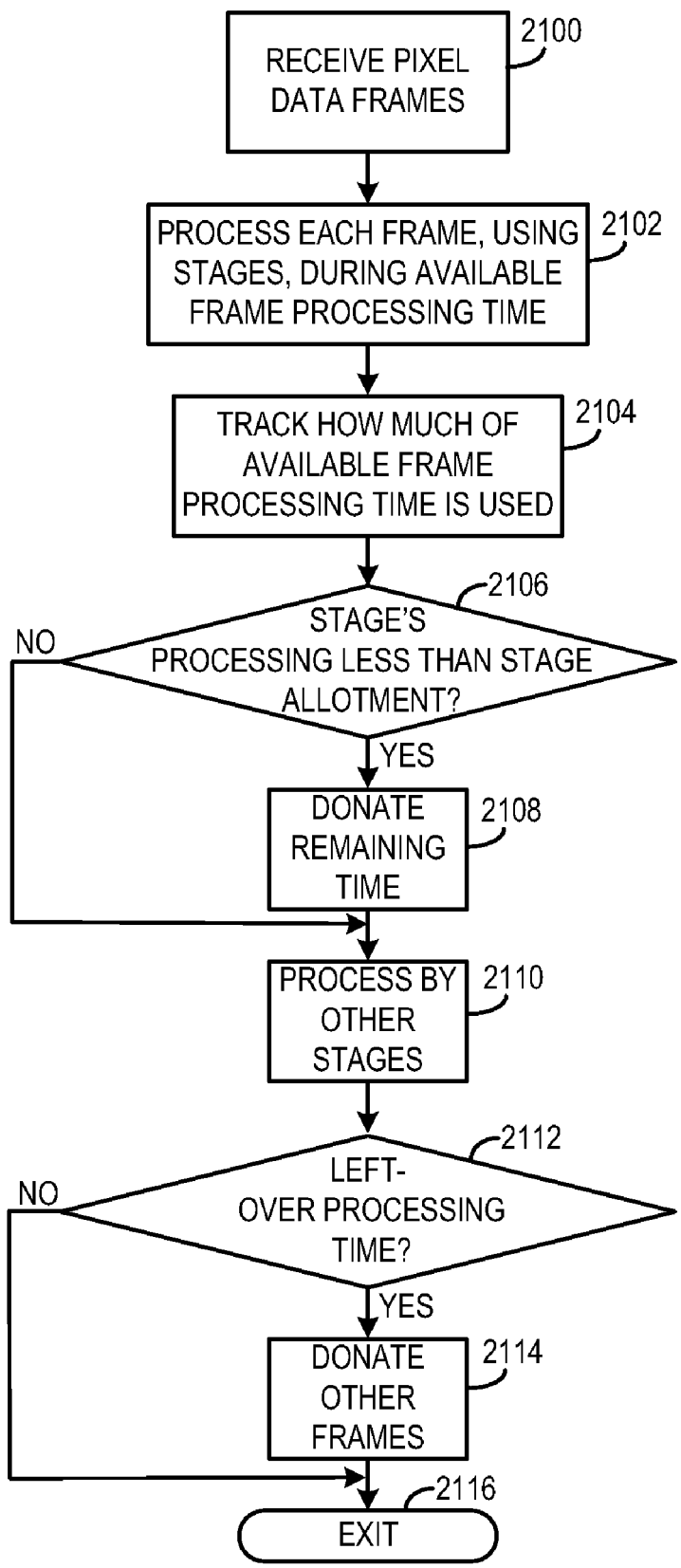
FIG. 21 is a flow chart illustrating generally another conceptual example of a processing time sharing method.

FIG. 21 is a flow chart illustrating generally another conceptual example of a processing time sharing method. In the example of FIG. 21, at 2100, temporally different frames of video pixel data are received. At 2102, each frame is processed, using image processing stages, during an available frame processing time period. At 2104, a time bank or other device is used to track how much of the available frame processing time period is used by each image processing stage. At 2106, if a frame processing time that is actually used by a particular image processing stage exceeds an allotted processing time for that particular image processing stage, then at 2108, the remaining time is donated for use by other stages. Other stages perform processing, as depicted at 2110. At 2112, if processing of a particular frame by all pipeline stages is complete, and there is leftover processing time, then at 2114, that frame donates its leftover processing time to other frames, such as other frames that are scheduled to be displayed later in the digital video sequence of frames. Otherwise, the depicted processing is exited at 2116.

Figure 22:
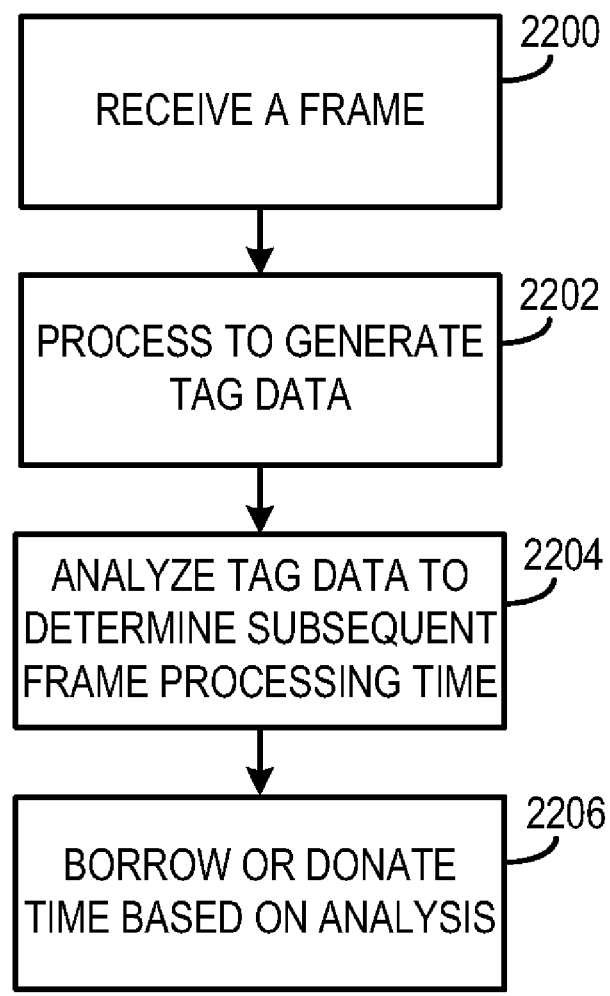
FIG. 22 is a flow chart illustrating generally another conceptual example of a processing time sharing method.

FIG. 22 is a flow chart illustrating generally another conceptual example of a processing time sharing method. At 2200 a frame 1702 is received, such as by storing it into the frame buffer 1700. At 2202, the frame is at least partially processed, such as by at least one of the stages 908, to generate tag data. In one example, the generated tag data is indicative of further processing time needed by the particular frame. For example, the stage processing may include a cost-function such as for motion estimation. In one example, a frame having more motion (e.g., localized to particular pixels in the frame, or global to all pixels in the frame, such as in a camera panning), the generated tag data indicative of more motion will indicate that more processing time is needed for a particular task (e.g., filtering) of that particular frame, or for one or more particular regions in that frame, or for other temporally adjacent or nearby frames that would presumably also include such greater motion. However, more motion may also indicate that less processing time is needed for another particular task (e.g., color processing) of that particular frame, or for one or more particular regions in that frame (e.g., because the human visual system does not perceive color as well in moving objects).

As another example, tag data is used to improve the efficiency of cost function estimation, such as motion estimation. For example, if the tag data indicates that a frame (or a group or groups of pixels) has a relatively flat field or solid color, then relatively less time is allocated for performing motion estimation on that frame (or group or group of pixels), because it is relatively difficult to obtain an accurate motion vector in such a situation (e.g., where there is less spatial detail from which to obtain the motion vector information). This avoids wasting excessive time computing a motion vector that is not easily obtainable or not as useful. Similarly, stage processing may generate tag data indicating many low edge angles, a high degree of lighting change, a scene change, a high degree of spatial detail, a proximity to a center of the image, each of which, individually or collectively, may be used to allocate processing time within regions of a frame, between different stages processing the same frame, and between different frames. In this manner, tag data is analyzed at 2204 to determine subsequent frame processing time needed by the frame, by one or more regions within the frame, by one or more stages in the frame. Based on the results of such analysis, at 2206, frame processing time is borrowed or donated to or from other stages in the pipeline or other frames in the frame buffer.

As a further example of the kind of analysis that can be included at 2204, different types or combinations of tag data may be used to determine frame processing time. As an illustrative example, both motion vector tag data and a spatial detail tag data can be used to allocate processing time by a motion-adaptive deinterlacer or smoothing filter. A high degree of motion ordinarily would result in allocating more processing time for filtering. However, in one example, this is qualified by the presence of high frequency spatial detail (e.g., deemed noise). In this example, if a frame (or a group or groups of pixels) is deemed noisy, then filtering time is reduced or aborted for that frame (or group or groups of pixels), and such time is donated for use by other groups or frames.

Figure 23:
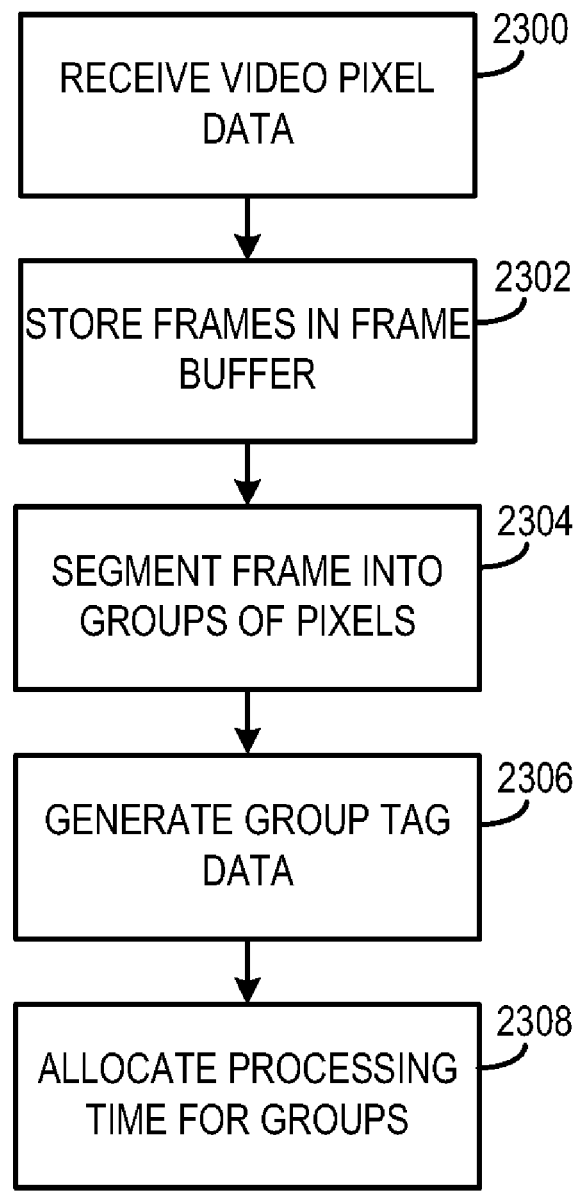
FIG. 23 is a flow chart illustrating generally another conceptual example of a processing time sharing method.

FIG. 23 is a flow chart illustrating generally another conceptual example of a processing time sharing method. At 2300, video pixel data is received. At 2302, one or more frames of video pixel data are stored, such as in a frame buffer. At 2304, at least one frame is segmented into groups of pixels. In one example, such segmenting includes forming contiguous regions such as the reference blocks 1502 of FIG. 15. At 2306, group tag data is generated. In one example, this includes processing the pixel data of at least one group by at least one image processing stage, such as a motion estimator. In various examples, the processing generates group tag data that includes one or more of: motion vector or other motion information for the group or global to all groups in the frame; edge angle information for the group; scene change information, such as derived from motion information, lighting information, or otherwise; a degree of spatial detail; a proximity to the center of the image, etc. At 2308, processing time for the groups is allocated using the generated tag data. In various examples, this includes one or more of: allocating available frame processing time by one or more stages between groups of the same frame; allocating processing time between frames; allocating processing time between particular groups of different frames, etc. Such allocation typically includes using the group tag data as a basis for borrowing or donating processing time to other groups in the same or different frames. In examples in which such allocation can be done in advance of such processing, it may be possible to avoid the premature suspension or termination of processing (such as illustrated at 2008 of FIG. 20) by appropriately allocating needed processing time before performing such processing.

EXAMPLE 4

Figure 24:
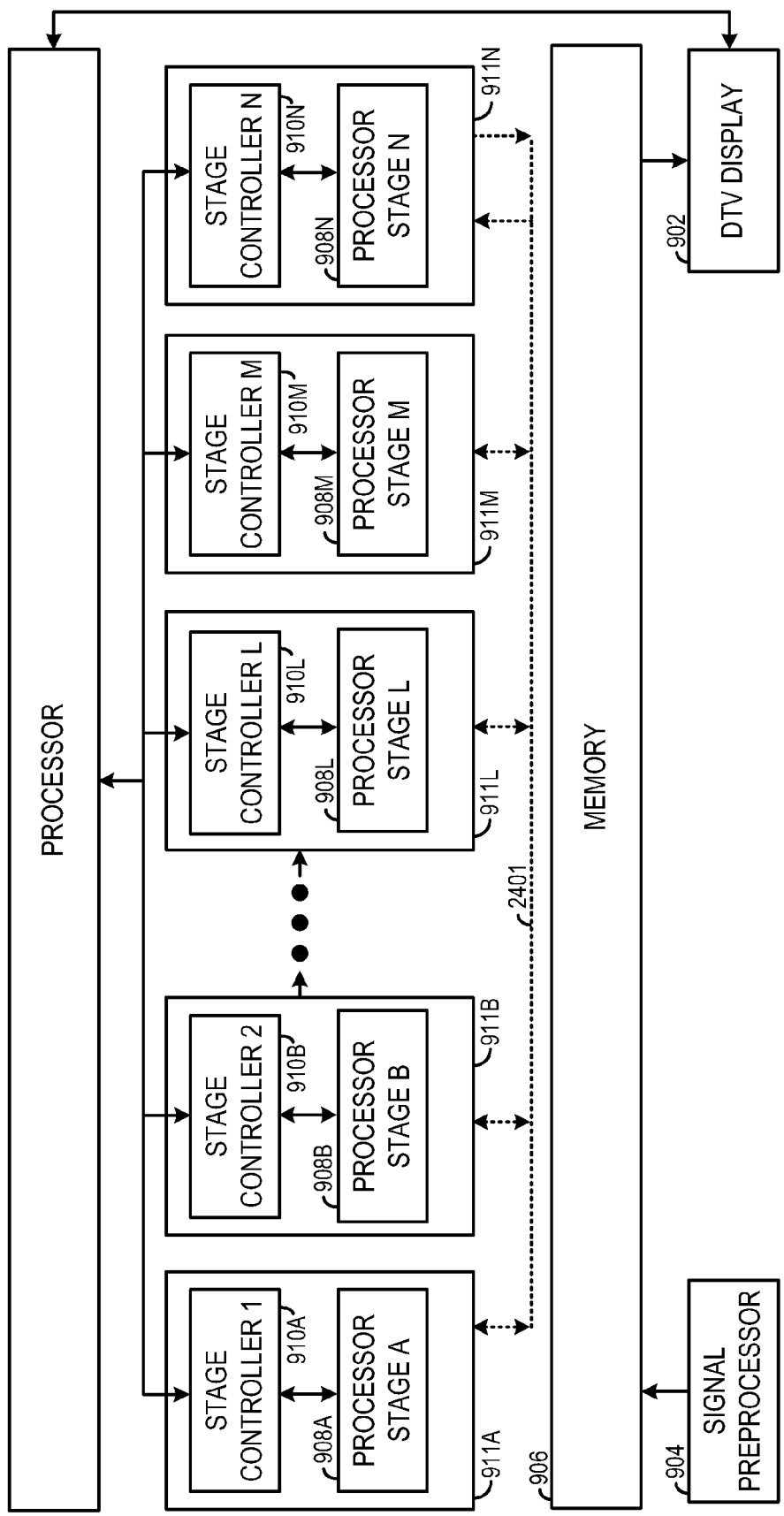
FIG. 24 is a block diagram, similar to FIG. 14, but illustrating a specific example of a processing pipeline that includes a utility pipeline segment.

FIG. 24 is a block diagram, similar to FIG. 14, but illustrating a specific example of a processing pipeline that includes a utility pipeline segment 911N. In this example the pixel data stored in the memory 906 undergoes sequential image analysis or processing by pipeline segments 911A through 911M. The pixel data is processed or not in a pipeline segment and then passed to the next pipeline segment. That is, segment 911A performs its processing task and then passes the processed pixel data to the next segment 911B. The segment 911B performs its processing task and then passes the processed pixel data to the next segment 911C (not shown in FIG. 24) and so on. The pipeline segments 911A-9111M transmit processed pixel data directly to the next pipeline segment in an example. In a further example, the pipeline segments 911A-911M transmit processed pixel data back to memory 906, which provides a central storage location for all pixel data waiting for the next pipeline segment. That is, the pipeline segments 911A-911N have the same architecture as FIG. 14 in this example. At least one of the pipeline segments 911A-911 L outputs tag data to the subsequent pipeline segment or memory 906. In a further example, the pipeline segments 911A-911L transmit tag data directly to the next pipeline segment. In a further example, the pipeline segments 911A-911M transmit tag data back to memory 906, which provides a central storage location for all tag data. Each pipeline segment 911A-911L transmits tag data to the subsequent pipeline segment, however, each pipeline segment need not create or alter the tag data. That is, a pipeline segment may pass to the next pipeline segment the same tag data that it received. Further, a pipeline segment may not use the tag data in the processing task.

As shown in FIG. 24, there is an additional, utility pipeline segment 911N. This pipeline segment is not part of the sequential processing flow of the other illustrated pipeline segments 911A-911M. The pipeline segment 911N is available to provide additional processing power on demand. As a result utility segment 911N selectively drops into and out of the sequential pipeline of segments 911A-911 M. The stage controllers 910A-910M control the processing flow of the pixel data and tag data, if any, through the processing pipeline. When a stage controller 910A-910M determines that additional processing power is desired or necessary to complete a processing task or refine the pixel data in a manner that is not always required in the pipeline, the respective stage controller 910A-910M signals the utility pipeline segment 911N. In an example, processing segment 911B can not complete its processing task in the time the segment is allotted. The time allotted to a particular processing task to be performed by segment 911B is based on the frequency required to output a frame of pixel data to the DTV display 902. Each processing segment 911A-911M is allotted a portion of the fixed time that a frame image enters the processing segment 911A and exits the last processing segment 911M for display. If a processing segment, in this example 911B, can not complete its processing in its allotted time it times out and quits its processing. The corresponding stage controller 910B may check the time bank as described herein to continue processing the current pixel data in the stage 911B. If no time is available or there is no time in the time bank, the stage 911B stops processing. The stage controller 910B communicates the stopped processing to the utility stage 911N through a bus 2401. The utility segment 911N loads the processing instructions and completes the aborted processing task of segment 911B.

The communication bus 2401 provides a communication link from the stage controller requesting activation of utility segment 911N. As the communication between utility segment 911N and pipeline segments 911A-911M is optional depending on processing requirements, bus 2401 is shown in broken line. In an example, processing stage 908A performs a pixel processing task and determines that further processing of a group of pixels is required. A flag can be set in the tag data to alert the stage controller 910A to activate stage controller 910N and processing stage 908N to perform a specific task. Segment 911A then sends pixel data to the utility segment 911N. Segment 911A may further send tag data to the utility segment 911N. Utility segment 911N then processes the pixel data according to a set of instructions. In an example, the utility segment 911N is not dedicated to a specific processing task. Accordingly, processing stage 908N of segment 911N will require activation of instructions for the processing task that will be performed by the utility segment. In an example, the stage controller 910N downloads the instructions to the processing stage 908N. The instructions for each processing task in all pipeline stages may be stored in stage controller 910N. In an example, stage controller 910N downloads the required instructions from memory, such as memory 906. The stage controller 908A of referring segment 911A may provide the stage controller 908N with an address whereat the instructions are stored. In a further example, the stage controller 908N may push the instructions to the stage controller 910N.

After processing the data, utility segment 911N returns processed pixel data to the segment that requested additional processing of the data. The utility segment 911N may return tag data representing a parameter of the processing that occurred in the utility segment. In a further example, the utility segment 911N is activated by one segment and sends its processed data to the next segment in the sequential pipeline. For example, pipeline segment 911A activates the utility segment 911N, which processes data outside the normal processing flow. Utility segment 911N returns pixel data and may return tag data to the next segment 911B in the sequence.

In an example and with reference to FIG. 9 wherein segment 911N now represents a utility segment, the processor 912 controls the processing flow and determines when and where in the process flow that the utility pipeline segment 911N provides additional processing. The stage controllers 910A-910M control the processing flow of the pixel data and tag data, if any, within the respective segment 911A-911M. When a stage controller 910A-910M determines that additional processing power is desired or necessary to complete a processing task or refine the pixel data in a manner that is not always required, the stage controller 910A-910M signals the processor 912. Processor 912 activates utility segment 911N. In an example, processing stage 908M performs a pixel processing task and determines that further processing of a group of pixels is required or that it can not complete its processing in the assigned time period. If the processing stage 908M can not complete its processing task in the time period, it activates utility segment 911N to perform some of segment 911M's processing tasks. Accordingly, the utility segment performs the same processing task as the referring segment. In an example, a flag can be set in the tag data to alert the stage controller 910M to in turn alert the processor 912 to activate stage controller 910N and processing stage 908N to perform a specific processing task. Pixel data and tag data, if any, are sent to the utility segment 911N. The pixel data sent to the utility segment 911N may be subset of the pixel data being processed by the referring segment 911M. In an example, each of the referring segment 911M and the utility segment 911N process different pixel data. The different pixel data may be different portions of a single frame.

In an example, the utility segment 911N is not dedicated to a specific processing task. Instructions are loaded from processor 912 to stage controller 910N and processing stage 908N. In an example, a flag is sent to the stage controller 910N, which loads or activates the proper instructions in the processing stage 908N. In an example, the stage controller 910N downloads the instructions to the processing stage 908N. The instructions may be stored in stage controller 910N or stage controller 910N downloads the required instructions from memory, such as memory 906. Utility segment 911N then processes the pixel data according to the instructions. After processing the data, utility segment 911N returns processed pixel data to the memory or the segment that requested additional processing of the data, in this example, segment 911M. The utility segment 911N may return tag data representing a parameter of the processing that occurred in the utility segment. In a further example, the utility segment 911N is activated by one segment and sends its processed data to the next segment in the sequential pipeline. For example, pipeline segment 911A activates the utility segment 911N, which processes data outside the normal processing flow. Utility segment returns pixel data and may return tag data to the next segment in the sequence.

It will be appreciated that the utility segment 911N is configurable to perform any pixel processing function as described herein. In an example, utility segment 911N downloads instructions or selects instructions that are performed on the data. These functions may not be the same as other processing tasks performed by the other segments. Moreover, the functions performed by the utility segment 911N may be similar tasks in a broad sense but may use different algorithms. The controller, e.g., stage controller or processor, that controls the activation of the utility segment selects the algorithm used in the in an example. Such algorithms are selected by tag data. Some of these processing functions are, but are not limited to, color processing, smoothing, scaling, deinterlacing, motion estimating, border rendering, image quality adjustment, etc. In an example, the utility segment 911N is configured to render on screen displays or specially process pixel data that includes on screen displays, which typically have more straight line edges than a moving picture, i.e., film or television program. On screen displays include text, borders, and other indicators added to a displayed image by the system 900. Examples of on screen displays include lists or grids of channel guides and program schedules. This lists and grids are further divided by viewing categories, such as sports, movies, comedies, children shows, etc. On screen displays are further used to assist a person with the set up of the display, satellite equipment, cable equipment, input sources, and output sources. A utility segment may further be adapted to speed processing when a split screen (two different pictures on a signal display), picture in picture where the smaller picture may require less processing than the larger picture or a different flow path than the larger picture for efficient processing.

While the utility segment 911N is described herein a single segment, utility segment 911N may represent a plurality of sub-segments each with a stage controller 910 and a processing stage 908 as described herein. Hence, the utility segment 911N in an example is a further sequential, utility pipeline having a plurality of sub-segments. Moreover, there may be a plurality of utility segments 911N that are individually, dynamically activated by other segments 911A-911M or by other utility segments 911N.

The utility segment architecture as described herein provides a system and a method for variably extending the number of processing stages. The utility segment(s) selectively insert a variable number of processing stages into the pixel processing flow. Accordingly, when additional processing is required, then the utility segments process pixel data on an as needed basis. This provides additional, dynamically alterable image processing power by variably adding or removing the utility segments to the image process flow. As a result, additional branches of the image processing flow operate on the pixel data in parallel with the normal process flow. This adds processing power as needed while maintaining the throughput, i.e., output time, of image frames to be displayed.

EXAMPLE 5

Figure 25:
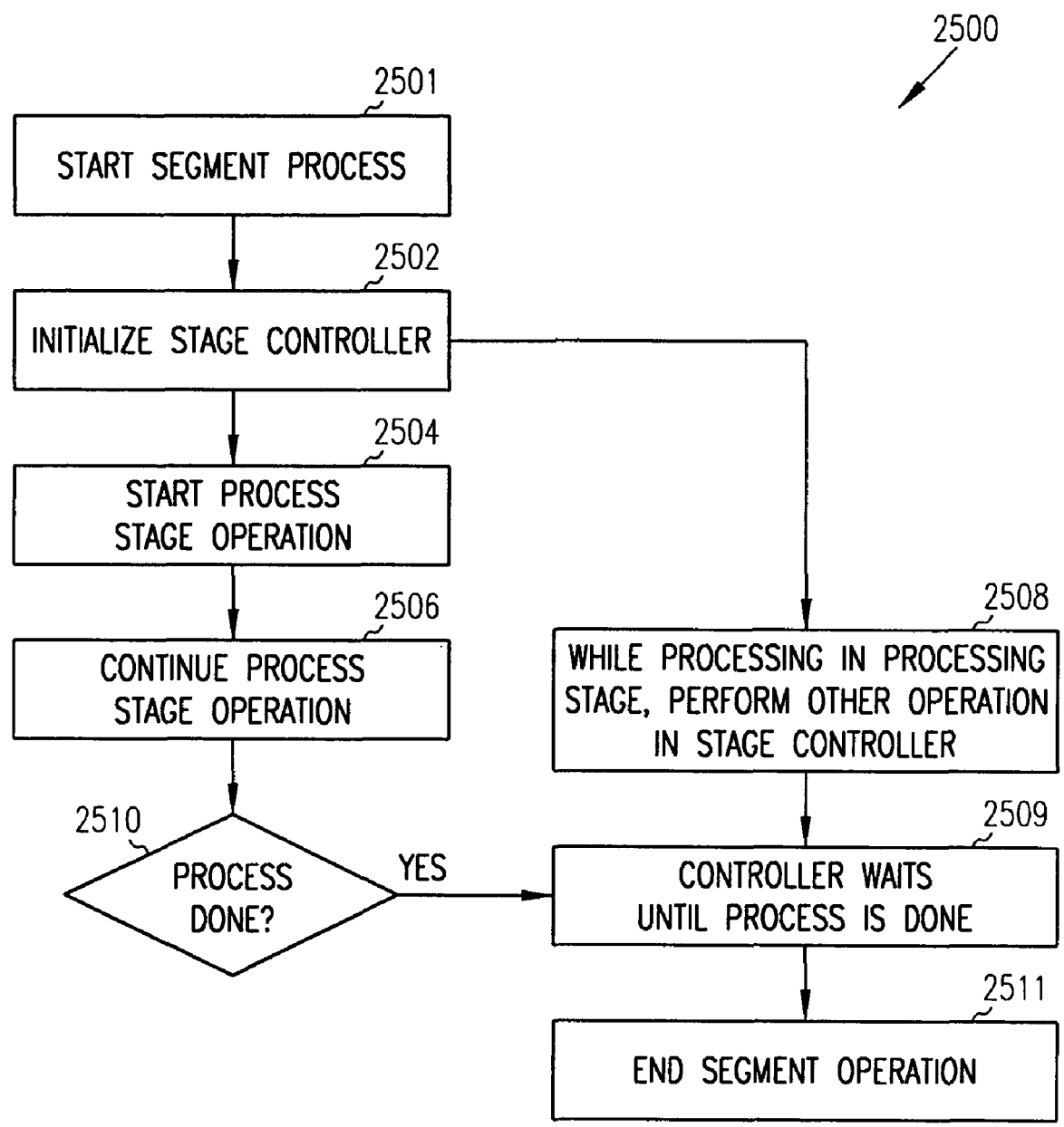
FIG. 25 is a flow chart illustrating an example of parallel operation in a pipeline segment.

FIG. 25 shows a flow chart of a process 2500 that can be used in system 900 and more particularly with segments 911A-911N. Process 2500 provides an efficient method for operating a segment 911A-911N. The method operates with parallel operations in the stage controller and the processing stage to save clock cycles and processing time. A multicycle instruction is started in a segment 911A-911N, 2501. More particularly, the stage controller 910A-910N receives code to begin a process related to the pixel data, 2502. The stage controller instructs the processing stage 908A-908N to begin its processing task, 2505. Processing stage 908A-908N performs its processing tasks 2505, typically such processing tasks require multiple clock cycles to perform. The stage controller 910A-910N does not sit idle and wait for the processing stage to return with the processing output. The stage controller 910A-910N will know how long the processing stage 908A-908N will take to perform a specific process task. In an example, each segment 911A-911N is dedicated to a particular processing task, which is programmed into the segment. The number of cycles the stage processor requires is stored in the segment's memory. This allows the stage controller to perform other operations while the stage 908A-908N is processing, 2508. These stage controller operations are selected such that they can be completed prior completion of the processing task in the processing stage. For example, the stage may be executing a processing task on pixel data, which may produce tag data, that takes N cycles. The stage controller can go an perform other operations that take fewer than N cycles. In an example, the stage controller will take less than $2^X$ cycles, where X is an integer greater than zero. In an example, the stage controller is programmed to perform only a specific set of operations that are known to take less than the cycle time, e.g., N cycles, of the processing stage. Accordingly, the stage controller will complete its parallel operation before the stage processor completes its processing task. The stage controller will now stall for the remaining process time of the processing stage. That is, the stage controller will wait until the processing stage completes its processing task, 2509. When the processing by the stage 908A-908N is complete, it will send a done signal to the now waiting stage controller 910A-910N, 2510. Now the stage controller will complete the segment's processing functions by sending the processed pixel and/or tag data to memory or subsequent processing segments.

The stage controller can be programmed to perform in parallel any operation that will take fewer clock cycles, i.e., time, than the processing stage requires to complete its processing task. Examples of stage controller operations include register updates, address updates, data movement between registers and memory. More specific examples, of stage controller parallel operations include, but are not limited to, loading new coordinates for a motion search, updating the address for the next set of pixels to be processed in the next processing task, and updating tag information. Essentially, the stage controller updates any type of data that does not require the current set of data or the results of the current processing task. Operations performed by the stage controller in parallel with the stage processor use a stage controller bus to move data. The controller bus is not stalled until its parallel operation is complete. The controller bus is internal to the stage controller. The controller bus moves data between internal memory of the stage controller and registers. The controller bus is further connected to a memory bus bridge device that provides communication between the controller bus and memory bus. The controller bus is further connected to a stage controller bridge that provides communication with the processor bus. Such parallel processing saves clock cycles that can be used in different processing pixel segments, further refining of the present pixel processing task, or used to bank additional time that can used in later processing.

Figure 26:
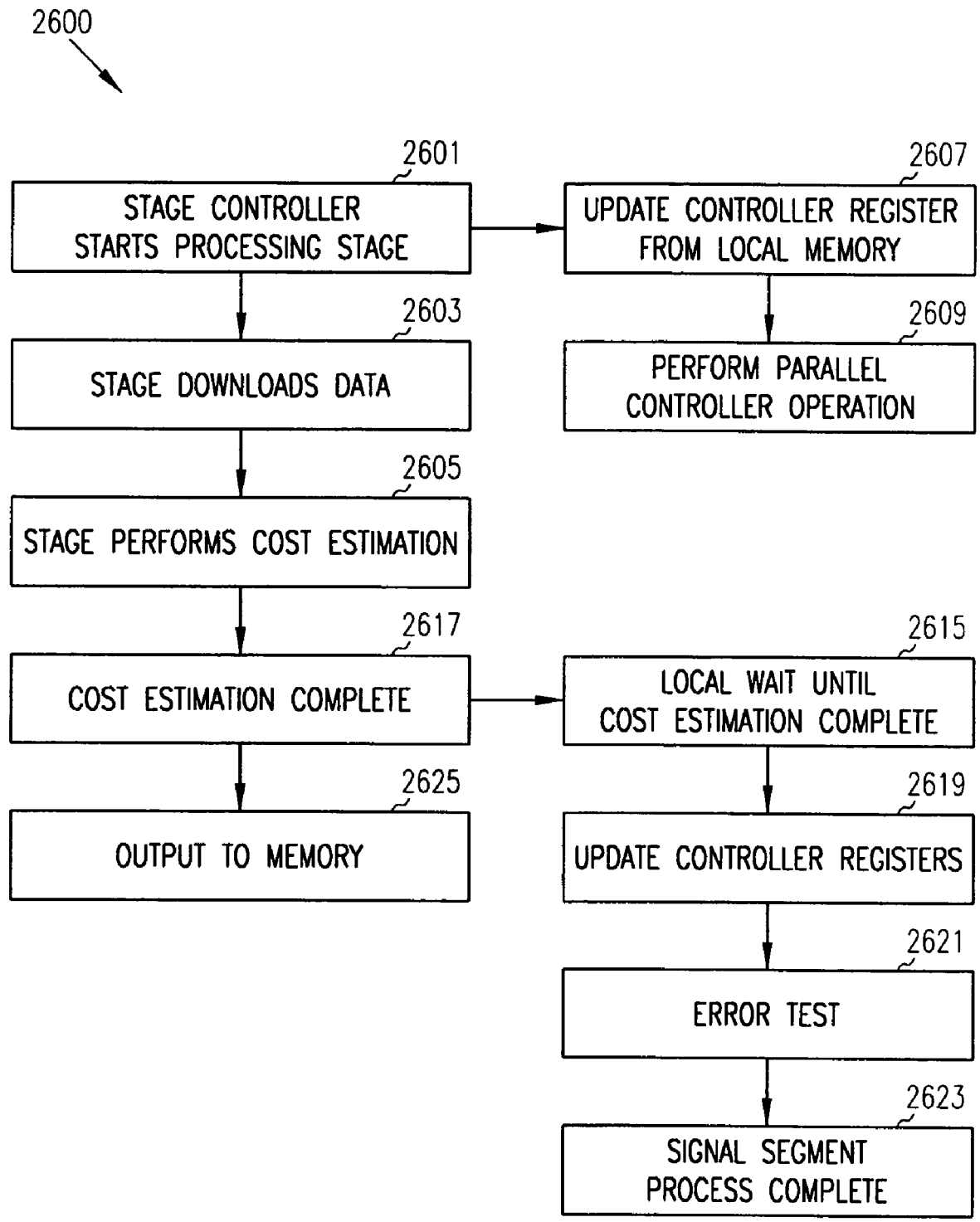
FIG. 26 is a flow chart illustrating another example of parallel operation in a pipeline segment.

FIG. 26 shows an example of a process 2600 as applied to a pipeline segment that performs a cost estimation process. A structure for performing a cost estimation process is described above with regard to FIG. 15. The stage controller instructs the processing stage to begin its processing task, 2601. Beginning the processing task includes fetching the instructions and the addresses for the data, which is transmitted on the controller local bus through the interface to the processing stage. The processing stage now begins processing the pixel data on its own without the need for further control or input by the controller. Processing stage downloads the pixel data and, if any, tag data, 2603. The processing stage performs the cost estimation processing task as it was instructed by the controller, 2605. The controller is now free to perform additional operations while the processing stage is performing the cost estimation. In an example for purposes of illustration, the cost estimation takes 10 clock cycles. The controller uses its local bus, which is not stalled by performing the cost estimation in the processing stage. The controller updates its registers, 2607. The controller can now perform additional short cycle time operations, 2609. In the present example, these operations must take 9 or fewer clock cycles so that the controller is ready when the processing stage completes its cost estimation process. In an example, the controller can set operation start flags in local memory or registers. The controller can further update a register indicating that a group of pixels were processed and fetch the address for the next group of pixels to be processed. In an example, the controller is programmed with the number of clock cycles the processing stage uses to perform its processing task. Accordingly, the controller is programmed to perform a number of operations that use less than the number of clock cycles required by the processing stage. In a further example, the controller between each additional controller task updates its register that tracks the time it has to return to the processing stage. That is, the cost estimation cycle time is stored in the controller memory. The number of clock cycles that the controller is operating in parallel is stored in a register. This register is then compared to the cost estimation cycle time. In step 2615, the controller waits for the processing stage to complete the cost estimation. In an example, the controller waits one or two clock cycles for the processing stage to complete cost estimation. Accordingly, the parallel processing can add between about 20-80% of clock cycles to the controller. The processing stage completes the cost estimation, 2617. Processing stage signals completion to the controller. The controller updates its registers and sends processed data to the memory, 2619. The controller further immediately launches the next cost estimation using the search location it has already loaded into its memory and possibly with the new pixel address that is also loaded into the controller memory. The controller can now perform error tests on pixel data previously processed, step 2621. The controller now signals an end of the cost estimation processing, 2623. The cost estimation processing stage outputs its data, pixel and if any, tag data to memory, 2625.

Figure 27:
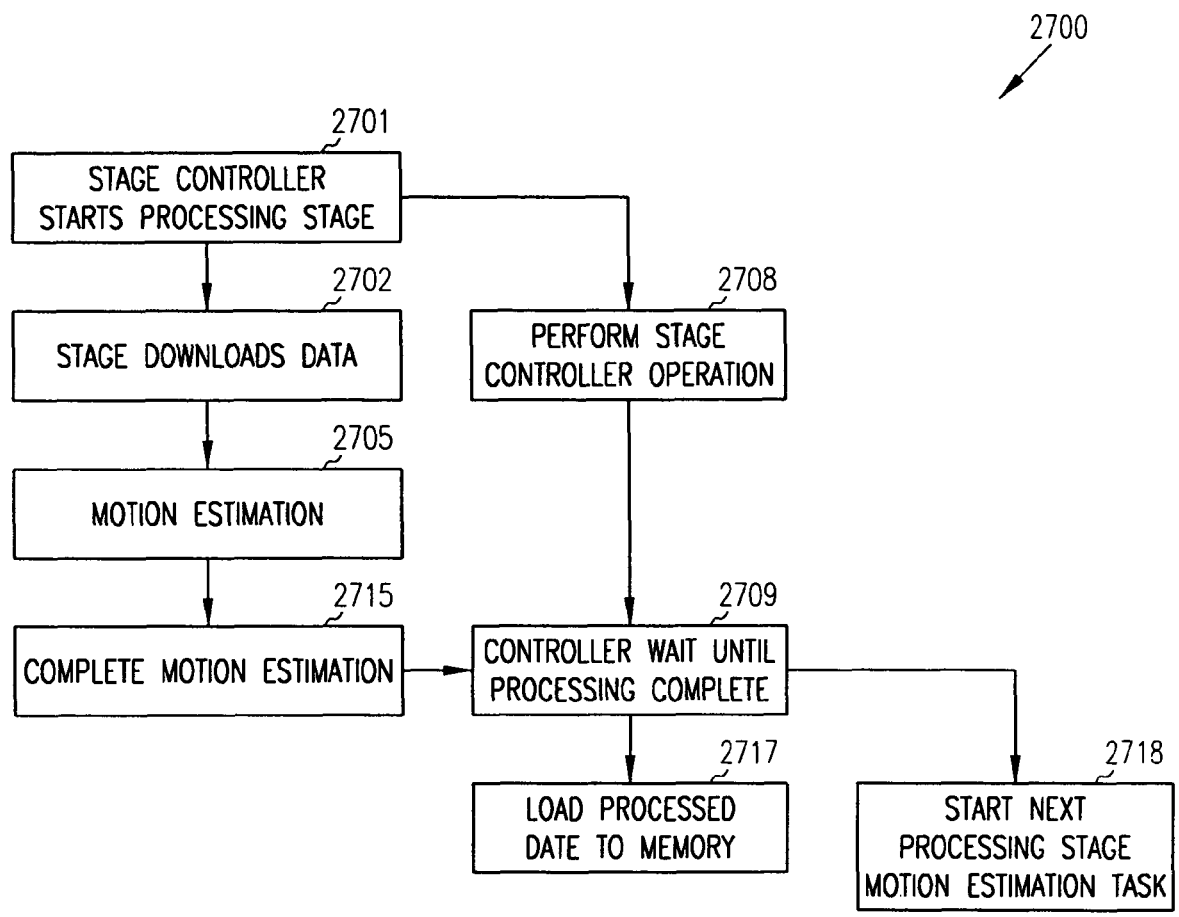
FIG. 27 is a flow chart illustrating another example of parallel operation in a pipeline segment.

FIG. 27 shows an example of a process 2700 as applied to a pipeline segment that performs a motion estimation process in the processing stage 910 as controlled by stage controller 908. The stage controller starts the processing stage, 2701. This start of the processing stage include providing the data that the processing stage will use in the motion estimation. While FIG. 27 describes the processing stage as performing a motion estimation, it is recognized that this process flow is adaptable to any digital image process described herein. In an example, the stage controller provides the address where the pixel data to be processed is found. The stage controller may provide the address for the tag data. In a example, the pixel data is loaded into a buffer. In a example, the tag data is loaded into a buffer. The processing stage downloads the data to be processed, 2702 The processing stage is now on its own, without further instruction or control of the stage controller and performs a motion estimation. In an example, the motion estimation is performed on a block of pixel data, e.g., an 8×8 block. In parallel with the processing stage performing motion estimation, the stage controller performs operations that take less than the number of cycles the processing stage requires for motion estimation, 2708. One such operation is the loading of the next direction to perform the motion estimation. For example, the next motion estimation will be based on the prior motion estimation location. Specifically, the controller loads a new search location based on either the prior search or the prior search results. The prior motion estimation was performed on a location four pixels up and two to the left. The subsequent location is four pixels up and two to the right. The subsequent location is four pixels down and two to the left. The subsequent location is four pixels down and two to the right. Other patterns of motion estimation are contemplated within the present method. The controller now waits until the motion estimation being performed in the processing stage to complete, 2709. The processing stage completes it motion estimation task, 2715, and reports completion to the stage controller. The controller signals that the processed data is to be loaded into memory, 2717, The controller further starts the next motion estimation task in the processing stage based on the updates the controller downloaded during the processing of the prior motion estimation task, 2718. This returns the method to step 2701.

The above examples described above under the numbered headings are set forth in this format for ease of description. It will be recognized that any of the examples can be practiced with any of the other examples. That is, a method that includes receiving video pixel data for processing by image processing stages during an available processing time period; generating tag data, using the processing of the pixel data by at least one first image processing stage, the tag data available for use by at least one second image processing stage, and the tag data including information that is non-identical to the pixel data; and allocating at least a portion of the available processing time period to at least one of the image processing stages using the tag data as at least one basis of the allocating, may also include uses a utility segment as described in example 3. This method may further be combined with parallel processing in the segment by the stage controller and the processing stage. In a further example, the parallel processing can be performed in the utility segment. Accordingly, the various examples described herein are combinable with each other.

Much of the above description described processing of video signals using tag or meta data. The above examples are adaptable for use with audio signal processing. i.e., tag data is generated with the digital audio signal. This tag data is used in the segments for processing of the audio signal to dynamically tune the audio processing.

The above elements of the present description are set forth as separate processing blocks for ease of description. These blocks, e.g., signal preprocessor 904, signal processor 912, memory 906, pairs of stage controller 910 and processing stage 908, can be fabricated together in various combinations on a single monolithic chip using integrated circuit fabrication techniques. In one example, all of the pairs of stage controllers and processing stages are fabricated together on a single integrated circuit die. The memory can be a separate memory chip, such as SRAM, a double data rate SDRAM, or other graphics dedicated memory.

The dynamic tag data and other features discussed herein enable a previously-unavailable level of integration and interaction between the different processing operations. Such integration allows elimination of the redundant segments or image processors in favor of a shared processing results through the tag data. Processing results by one segment or image processor (e.g., a motion estimator) may then be used for all of the segments.

The above description is intended to be illustrative, and not restrictive. For example, the above-described embodiments (or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A digital video signal processing method comprising:
    receiving a video signal including two or more frames, each frame having video pixel data for processing by image analysis or processing stages during an available processing time period;
    segmenting a frame of pixel data into groups of one or more pixels;
    generating tag data for at least one of the groups, using the processing of the pixel data by at least one first image analysis or processing stage, the tag data available for use by at least one second image analysis or processing stage, and the tag data including information that is non-identical to the pixel data; and
    allocating at least a portion of the available processing time period to at least one of the image analysis or processing stages for processing a particular group using the tag data of that group as at least one basis of the allocating.

2. The method of claim 1, in which the generating tag data includes estimating a motion of pixel data of one or more pixels, the motion occurring between temporally different frames of the pixel data.

3. The method of claim 2, in which the allocating includes allocating relatively more time to at least one pixel having relatively more motion than to at least one other pixel having relatively less motion.

4. The method of claim 1, comprising reserving excess processing time of a particular group for use by at least one other group.

5. The method of claim 4, comprising borrowing processing time for a particular group from processing time allocated to at least one other group.

6. The method of claim 1, comprising selecting or adjusting at least one algorithm used on a group by an image analysis or processing stage using the tag data of that group.

7. The method of claim 1, in which the generating tag data includes estimating a motion between temporally different frames of pixel data of one or more pixels, and in which the allocating includes allocating using the estimated motion as at least one basis of the allocating.

8. The method of claim 1, in which the generating tag data includes determining a spatial characteristic of pixel data of one or more pixels, and in which the allocating includes allocating using the determined spatial characteristic as at least one basis of the allocating.

9. The method of claim 8, in which the determining the spatial characteristic includes determining an edge angle characteristic, and in which the allocating includes allocating using the edge angle characteristic as at least one basis of the allocating.

10. The method of claim 8, in which the determining the spatial characteristic includes determining a spatial location of the one or more pixels within an image frame, and in which the allocating includes allocating using the spatial location as at least one basis of the allocating.

11. The method of claim 10, in which the determining the spatial location includes determining a proximity to a center of the image, and in which the allocating includes weighting the allocating toward providing relatively more processing time to a first spatial location that is relatively nearer to the center of the image than to a second spatial location that is relatively farther from the center of the image.

12. The method of claim 8, in which the determining the spatial characteristic includes determining a degree of spatial detail of the one or more pixels within an image frame, and in which the allocating includes using the degree of spatial detail as at least one basis of the allocating.

13. The method of claim 1, in which the generating tag data includes applying at least one cost function to pixel data of one or more pixels, and in which the allocating includes allocating using a result of the cost function as at least one basis of the allocating.

14. The method of claim 13, in which the applying at least one cost function includes obtaining a motion estimation.

15. The method of claim 13, in which the applying at least one cost function includes obtaining a spatial detail indication.

16. The method of claim 1, in which the generating tag data includes generating tag data indicative of a global motion between different frames of the pixel data, and in which the allocating includes using the tag data indicative of the global motion as at least one basis of the allocating.

17. The method of claim 1, in which the generating tag data includes generating tag data indicative of a lighting change between different frames of the pixel data, and in which the allocating includes using the tag data indicative of the lighting change as at least one basis of the allocating.

18. The method of claim 17, in which the generating tag data indicative of a lighting change includes generating tag data indicative of a global lighting change between different frames of the pixel data.

19. The method of claim 17, in which the generating tag data indicative of a lighting change includes generating tag data indicative of a local lighting change between different frames of the pixel data.

20. The method of claim 1, in which the generating tag data includes generating tag data indicative of a temporal scene change between different frames of the pixel data, and in which the allocating includes using the tag data indicative of the temporal scene change as at least one basis of the allocating.

21. The method of claim 1, in which the generating tag data includes generating tag data indicative of a temporal difference in pixel data of the same one or more pixels over temporally different frames being processed, and in which the allocating includes using the tag data indicative of the temporal difference as at least one basis of the allocating.

22. The method of claim 1, in which the generating tag data includes generating tag data for temporally different frames of the pixel data, and in which the allocating includes using the tag data for temporally different frames of the pixel data to allocate processing time.

23. The method of claim 22, comprising storing a group of successive frames of pixel data in a frame buffer, and in which the allocating includes using the tag data for the temporally different frames of the pixel data that are stored in the frame buffer as at least one basis of allocating processing time.

24. The method of claim 23, in which the allocating using the tag data for the temporally different frames of the pixel data includes allocating processing time within a single frame of the pixel data.

25. The method of claim 23, in which the allocating using the tag data for the temporally different frames of the pixel data includes allocating processing time across more than one frame of the pixel data.

26. The method of claim 1, in which the generating tag data includes generating motion tag data and generating edge angle identifier tag data.

27. A digital video signal processing method comprising:
receiving video pixel data for processing by image analysis or processing stages during an available processing time period;
storing temporally different frames of the pixel data in a frame buffer;
segmenting the frames into groups of one or more pixels; and
generating group tag data for at least one group, using the processing of the pixel data by at least one first image analysis or processing stage, the tag data available for use by at least one second image analysis or processing stage, and the tag data including at least motion information and edge angle information for the group; and
allocating at least a portion of the available processing time period using the motion information and the edge angle information of the tag data as bases of the allocating, the allocating comprising reserving excess processing time estimated for a particular group for use by at least one other group of a same or different frame, the allocating comprising borrowing processing time for a particular group from processing time allocated to at least one other group of a same or different frame.

28. The method of claim 27, in which the allocating includes providing relatively more processing time to a first spatial location that is relatively nearer to the center of the image than to second spatial location that is relatively farther from the center of the image.

29. The method of claim 27, in which the generating group tag data for a group includes generating tag that that also includes information about how much spatial detail exists within the group.

30. The method of claim 27, in which the allocating includes allocating processing time between first and second image analysis or processing stages, the first image analysis or processing stage including de-interlacing and the second image analysis or processing stage including scaling.

31. A digital video signal processing system for processing a video signal including two or more frames, each frame having video pixel data, comprising:
a first image analysis or processing stage, including a pixel data output providing pixel data, and a tag data output providing tag data, the tag data including information that is non-identical to the pixel data;
a second image analysis or processing stage, including a pixel data input for receiving pixel data, and a tag data input for receiving tag data;
an image analysis or processing stage controller, coupled to the first and second stages, the stage controller operable for allocating a processing time of at least one of the first and second stages using the tag data as at least one basis of the allocating; and
a memory operably coupled to the stage controller, the memory including a frame buffer, the frame buffer including:
a pixel frame buffer, operable to store temporally different frames of the pixel data; and
a tag data buffer, operable to store tag data.

32. The system of claim 31, comprising a signal pre-processor, operably coupled to the memory, the signal pre-processor comprising:
a video signal capture circuit, including an input to receive the video signal;
a digital television broadcast signal decoder, including an input to receive a digital television broadcast signal;
a pixel data output, operably coupled to provide pixel data to the pixel frame buffer; and
a tag data output, operably coupled to provide tag data to the tag data buffer, wherein the signal pre-processor generates the tag data using information received by at least one of the video signal capture circuit and the digital television broadcast signal decoder.

33. The system of claim 31, in which the first image analysis or processing stage includes a motion estimator operable to detect a motion of pixel data of one or more pixels between temporally different frames of the pixel data, the motion estimator operable to generate the tag data based on the motion.

34. The system of claim 33, in which the second image analysis or processing stage includes a cadence detector performing a cadence detection at least in part by using the tag data based on the motion.

35. The system of claim 33, in which the second image analysis or processing stage includes a motion adaptive de-interlacer operable to perform de-interlacing and allocating a processing time of the de-interlacing at least in part by using the tag data based on the motion.

36. The system of claim 33, in which the motion estimator includes a frame segmenter to segment a frame of pixel data into groups of one or more pixels, and in which the tag data includes group tag data for at least one of the groups.

37. The system of claim 36, in which the motion estimator includes a cost function module operable to compute a cost function of a group between temporally different frames.

38. The system of claim 31, in which the second image analysis or processing stage includes a de-interlacer operable to perform de-interlacing and allocating a processing time of the de-interlacing at least in part by using the tag data.

39. The system of claim 38, comprising an image scaler operable to perform image scaling and allocating a processing time of the scaling at least in part by using the tag data.

40. The system of claim 38, comprising a smoothing filter operable to perform image smoothing and to allocate a processing time of the smoothing using the tag data.

41. The system of claim 39, comprising a color processor operable to perform color processing and to allocate a processing time of the color processing at least in part by using the tag data.

42. A machine-usable medium including instructions thereon for modifying functionality of a machine to perform the acts of:

receiving a video signal including two or more frames, each frame having video pixel data for processing by image analysis or processing stages during an available processing time period;

generating tag data using the processing of the pixel data by at least one first image analysis or processing stage at least by determining a spatial characteristic of pixel data of one or more pixels, the tag data available for use by at least one second image analysis or processing stage, and the tag data including information that is non-identical to the pixel data; and allocating at least a portion of the available processing time period to at least one of the image analysis or processing stages using the spatial characteristic as at least one basis of the allocating.

43. A machine-usable medium including instructions thereon for modifying functionality of a machine to perform the acts of:

receiving video pixel data for processing by image analysis or processing stages during an available processing time period;

storing temporally different frames of the pixel data in a frame buffer;

segmenting the frames into groups of one or more pixels; and generating group tag data for at least one group, using the processing of the pixel data by at least one first image analysis or processing stage, the tag data available for use by at least one second image analysis or processing stage, and the tag data including at least motion information and edge angle information for the group; and allocating at least a portion of the available processing time period using the motion information and the edge angle information of the tag data as bases of the allocating, the allocating comprising reserving excess processing time estimated for a particular group for use by at least one other group of a same or different frame, the allocating comprising borrowing processing time for a particular group from processing time allocated to at least one other group of a same or different frame.

* * * * *